United States Patent
Karlberg et al.

(10) Patent No.: US 12,511,283 B2
(45) Date of Patent: Dec. 30, 2025

(54) PARALLELIZATION OF DISTRIBUTED GRAPH QUERIES

(71) Applicant: MICROSOFT TECHNOLOGY LICENSING, LLC, Redmond, WA (US)

(72) Inventors: Jan-Ove Almli Karlberg, Troms og Finnmark (NO); Anders Tungeland Gjerdrum, Troms (NO); Marius Indreberg, Troms og Finnmark (NO)

(73) Assignee: MICROSOFT TECHNOLOGY LICENSING, LLC, Redmond, WA (US)

( * ) Notice: Subject to any disclaimer, the term of this patent is extended or adjusted under 35 U.S.C. 154(b) by 0 days.

(21) Appl. No.: 18/670,104

(22) Filed: May 21, 2024

(65) Prior Publication Data

US 2025/0363107 A1  Nov. 27, 2025

(51) Int. Cl.
  *G06F 16/2453* (2019.01)
  *G06F 16/2458* (2019.01)
  *G06F 16/25* (2019.01)

(52) U.S. Cl.
  CPC .......... *G06F 16/24532* (2019.01); *G06F 16/24542* (2019.01); *G06F 16/2471* (2019.01); *G06F 16/256* (2019.01)

(58) Field of Classification Search
  CPC ......... G06F 16/24532; G06F 16/24542; G06F 16/2471; G06F 16/256
  See application file for complete search history.

(56) References Cited

U.S. PATENT DOCUMENTS

| | | | |
|---|---|---|---|
| 2021/0073285 A1* | 3/2021 | Hunter | G06F 16/212 |
| 2023/0014681 A1* | 1/2023 | Hauck | G06F 16/2458 |
| 2023/0289626 A1* | 9/2023 | Dai | G06F 16/2453 |
| 2023/0350890 A1 | 11/2023 | Gjerdrum | |
| 2024/0095241 A1* | 3/2024 | Zheng | G06F 16/9024 |
| 2025/0028724 A1* | 1/2025 | Ostertag | G06F 16/24545 |
| 2025/0036627 A1* | 1/2025 | Eich | G06F 16/24542 |

OTHER PUBLICATIONS

Kanellakis, et al., "Efficient Parallel Algorithms on Restartable Fail-stop Processors", accessed on URL: https://apps.dtic.mil/sti/tr/pdf/ADA236249.pdf, Jun. 4, 1991, 14 pages.

(Continued)

*Primary Examiner* — Dangelino N Gortayo

(57) ABSTRACT

Technology is disclosed for programmatically parallelizing distributed graph queries of a graph metaphor of distributed data sources through various applications or platforms. Query candidates corresponding to distributed data sources are determined by applying a graph query to a graph metaphor of the distributed data sources. A set of query steps representing a set of distributed queries of the query candidates are determined based on corresponding properties of the query candidates from the graph metaphor. The set of query steps are executed in parallel in order to determine a response to the graph query. The data is provided in response to the graph query.

20 Claims, 11 Drawing Sheets

(56) References Cited

OTHER PUBLICATIONS

Kang, et al., "Automatic Parallelization of Database Queries", accessed on URL: https://docs.lib.purdue.edu/cgi/viewcontent.cgi?article=1703&context=ecetr, Jan. 1, 1990, 24 pages.
Xu, et al., "Native Parallel Graphs—The Next Generation of Graph Database for Real-Time Deep Link Analytics", Tiger Graph, 2018, 89 pages.
Mssaperla, et al., "Manage personal access tokens", accessed on URL: https://learn.microsoft.com/en-us/azure/databricks/administration-guide/access-control/tokens, Feb. 6, 2024, 5 pages.

* cited by examiner

PARALLELIZATION OF DISTRIBUTED GRAPH QUERIES

BACKGROUND

Typically, a knowledge graph stores data in a graph database. The data is inherently structured in a graph format, with entities represented as nodes and relationships as edges, in the graph database. Thus, when a graph-based operation, such as a graph query, is performed on the knowledge graph that requires the data to be accessed, the data is accessed through the graph database. In contrast, a graph metaphor models data stored in databases in various formats to resemble a knowledge graph, with entities determined from the databases represented as nodes and relationships as edges. In this regard, when a graph-based operation, such as a graph query, is performed on the graph metaphor that requires the data to be accessed, the data is accessed through the database in the corresponding format of the database.

SUMMARY

This summary is provided to introduce a selection of concepts in a simplified form that are further described below in the detailed description. This summary is not intended to identify key features or essential features of the claimed subject matter, nor is it intended to be used in isolation as an aid in determining the scope of the claimed subject matter.

Embodiments described in the present disclosure are directed towards technologies for improving searching computing applications and user computing experiences on user computing devices (sometimes referred to herein as user devices). In particular, this disclosure provides technologies to programmatically parallelize distributed graph queries using a graph metaphor representing a plurality of data sources, such as different regions of a federated database system, including nodes representing entities of the plurality of data sources, such as files stored in the data sources, and edges representing relationships between the nodes. The node properties stored in the nodes of the graph metaphor include metadata describing the entity, such as the name and data source location of the entity, and/or query properties indicating constraints when querying the entity. In this regard, for a node representing data of a data source, only the node properties are stored in the graph metaphor while the data itself is stored in the data source. The edge properties include metadata describing the relationship and/or query properties indicating constraints when querying the edge. A graph query is received and parsed to determine a representation of query candidates from the graph metaphor, such as data sources and/or regions of the federated database system, that will need to be queried in order to determine a response to the graph query. A parallelized query plan is determined based on the set of query steps in order to query each of the query candidates and speed up execution of the query. The parallelized query plan is executed by executing parallelized distributed queries of the query candidates through plug-ins for each of the data sources. The results of the parallelized query plan are combined into a query result and presented to the user in response to the query.

BRIEF DESCRIPTION OF THE DRAWINGS

Aspects of the disclosure are described in detail below with reference to the attached drawing figures, wherein.

DETAILED DESCRIPTION

Figure 1:
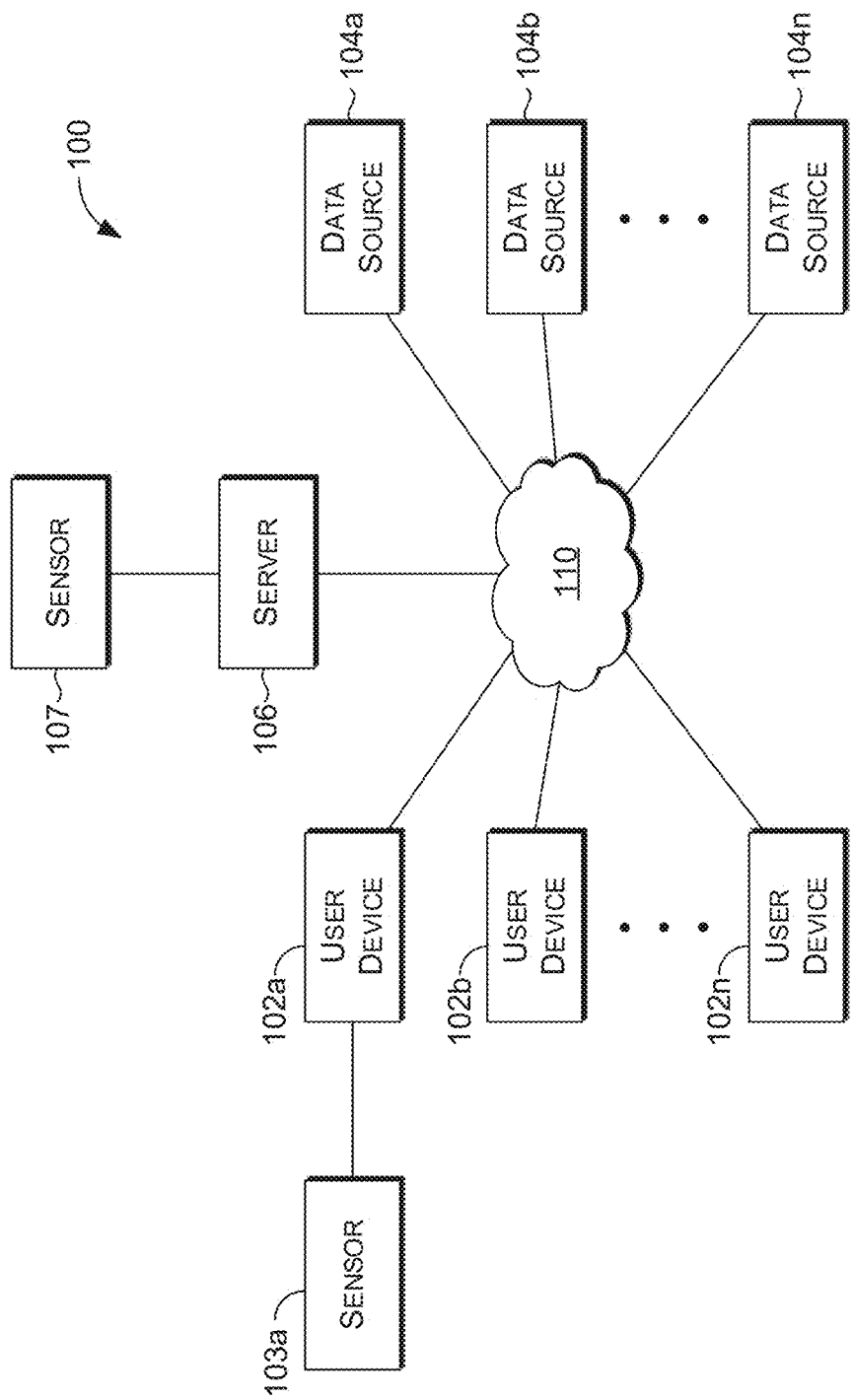
FIG. 1 is a block diagram of an example operating environment suitable for implementations of the present disclosure.

The subject matter of aspects of the present disclosure is described with specificity herein to meet statutory requirements. However, the description itself is not intended to limit the scope of this patent. Rather, the inventors have contemplated that the claimed subject matter might also be embodied in other ways, such as to include different steps or combinations of steps similar to the ones described in this document, in conjunction with other present or future technologies. Moreover, although the terms "step" and/or "block" may be used herein to connote different elements of methods employed, the terms should not be interpreted as implying any particular order among or between various steps herein disclosed unless and except when the order of individual steps is explicitly described. Each method described herein may comprise a computing process that may be performed using any combination of hardware, firmware, and/or software. For instance, various functions may be carried out by a processor executing instructions stored in memory. The methods may also be embodied as computer-useable instructions stored on computer storage media. The methods may be provided by a stand-alone application, a service or hosted service (stand-alone or in combination with another hosted service), or a plug-in to another product, to name a few.

Aspects of the present disclosure relate to technology for improving electronic communication technology and enhanced computing services for a user, based on identifying parallelized distributed graph queries. In particular, the solutions provided herein include technologies to programmatically parallelize distributed graph queries of a graph metaphor of distributed data sources. For example, a graph metaphor representing a plurality of data sources, such as distributed databases, data stores, services, applications, and/or others, is stored. Each data source of the plurality of data sources can be optimized to store different types of data. The graph metaphor models entities of the plurality of data sources and relationships between the entities to provide semantic connections between the data of the plurality of data sources to abstract complex relationships into a more manageable form for graph-based operations without sacrificing the optimization of each of the plurality of data sources. For example, a data source is optimized for email storage to serve mail efficiently, such as by providing faster access to the most recent emails in response to queries and slower access to emails based on the age of the email. As another example, data sources can be optimized for quick access of small portions of data of a file, and the remaining portions of the file can be stored in different data sources.

In some embodiments, the graph metaphor may correspond to a federated logical graph representing heterogeneous stores of a federated database system. A federated database system generally refers to a database architecture that integrates multiple autonomous and/or heterogeneous databases into a unified system, allowing the databases to function collectively while maintaining individual autonomy. Each region of the federated database system can refer to different databases or sets of databases of the federated database system. For example, each region of the federated database system may differ by geographical location, administrative control, data type, and database management and storage solutions. The federated database system enables efficient data operations across diverse data sources through a unified interface, while preserving data locality, integrity, and efficiencies of the type of database. In this regard, each region of the federated database system can be optimized to store different types of data.

The graph metaphor includes nodes representing entities of the plurality of data sources (e.g., heterogeneous stores of a federated database system) and edges representing relationships between the nodes. Examples of entities represented by nodes of the graph metaphor include data sources, such as each of the data sources modeled by the graph metaphor; users, such as individual users within an organization; groups, such as distribution lists; messages, such as email messages in a user's mailbox; events, such as calendar events in a user's calendar; files and/or portions of files, such as files and/or portions of files stored in each corresponding data source; devices, such as devices registered in the organization; applications, such as various applications that utilize files or data sources; and/or any other type of data and/or service stored and/or utilized by a data source.

Examples of relationships between nodes represented as edges of the graph metaphor, such as an edge (for example, named memberOf) that connects a user node to groups or roles that the user is a member of; an edge (for example, named manager) that connects a user node to another user node who is their manager; an edge (for example, named attachments) that connects an email or event node to files or items attached to it; an edge (for example, named createdByUser) that connects files, tasks, or other items to the user node of the person who created them; an edge (for example, named events) that connects a user or group node to the calendar events they are associated with; an edge (for example, named messages) that connects a user node to their email messages; an edge (for example, named ownedDevices) that connects a user node to devices they own within an organization; an edge (for example, named subscriptions) that connects a user or application node to notifications for changes in user data, messages, or other monitored resources; and/or any other type of relationship between any type of data and/or service stored and/or utilized by a data source.

The graph metaphor stores properties of the nodes and edges based on a corresponding type of entity and type of relationship, respectively. The node properties include descriptive attributes describing the entity, such as metadata indicating the name of the entity and data source location of the entity, and/or query properties indicating constraints when querying the entity. In this regard, for a node representing data of a data source, only the node properties are stored in the graph metaphor while the data itself (for example, the content) is stored in the data source. The edge properties include descriptive attributes describing the relationship, such as metadata indicating a time when the relationship was created, and/or query properties indicating constraints when querying the edge, such as through an edge traversal.

Examples of query properties include an indication of available identifiers that can be used to query an entity, such as the type of descriptive identifier supported by a data source; an indication of available query functions, such as whether the entity can support edge traversal, a lookup of node by ID, a search function, and/or any other query function; access requirements, such as requiring a call to a security service to confirm access to data for the user; and/or any other properties that indicate constraints when querying.

A graph query is received and parsed to determine a representation of query candidates from the graph metaphor. The query candidates correspond to entities, such as data sources and/or regions of the federated database system, and/or relationships that will need to be queried in order to determine a response to the graph query. For example, a user inputs a query for data, and the query is received via an Application Programming Interface (API) of the graph metaphor. A query is applied to the graph metaphor as a graph query utilizing any known graph querying technique. The representation of query candidates corresponding to each node and/or edge of the graph metaphor that will need to be queried in order to determine a response to the graph query is determined.

The query properties of each of the query candidates are used to determine a query plan. The query plan includes a set of query steps to be performed in order to query each of the query candidates. For example, the query plan can include a first step to meet access control requirements of a first data source corresponding to a query candidate, a second step to query the first data source, a third step to meet access control requirements of a second data source corresponding to a query candidate and a fourth step to query the second data source.

A parallelized query plan is determined based on the set of query steps in order to speed up execution of the query. The parallelized query plan is executed by executing parallelized distributed queries of the query candidates through plug-ins for each of the data sources, such as rest APIs, SQL database plug-ins, graph database plug-ins, search engine plug-ins, and/or any other plug-in for any type of data source. Continuing with the example, the first step to meet access control requirements of the first data source and the third step to meet access control requirements of the second data source can be performed in parallel. The second step to query the first data source and the fourth step to query the second data source can be performed in parallel. Alternatively, the first step to meet access control requirements of the first data source and the second step to query the first data source can be performed in parallel. The third step to meet access control requirements of the second data source and the fourth step to query the second data source can be performed in parallel. However, if the data of the first data source and second data source is returned before access control is confirmed, the data of the first data source and second data source can remain in a sandbox environment so that the data is not provided in response to the query until access control is confirmed.

Additional examples of programmatically parallelizing distributed graph queries of a graph metaphor of distributed data sources are described in connection with FIGS. 3 and 4A-4D.

In some embodiments, the parallelized query plan is determined based on latency, cost, reliability, and/or other similar factors, such as through statistics, rules, and/or heuristics. In some embodiments, a machine learning model is used to determine the parallelized query plan based on available metrics, such as expected performance gain due to parallelization, the cost in terms of CPU utilization, memory consumption, or computational cost, statistics on how frequently the result of executing the access control logic is positive, and/or any other factors.

A query result is determined from the parallelized distributed queries of each of the data sources. For example, the results from execution of each of the parallelized distributed queries are combined, such as through a conflate operation and/or de-deduplicate operation to de-duplicate redundant data. The query result is then presented to the user in response to the query.

Overview of Technical Problems, Technical Solutions, and Technological Improvements Conventional technology lacks computing functionality to automatically programmatically parallelize distributed graph queries of a graph metaphor of distributed data sources to provide improved searching computing applications and an improved user computing experience. Consequently, because conventional technology lacks this functionality, in order to perform distributed graph queries of distributed data sources, the data sources must be sequentially queried without the capability to parallelize the distributed graph queries of each of the distributed data sources. Unfortunately, because the distributed graph queries of distributed data sources must be sequentially queried, the process increases latency, is time-consuming, and computationally expensive in order to sequentially query data sources and/or repeating access control determination steps. In this regard, additional computing and network resources must be utilized, such as increased processing requirements due to increased input/output operations, increased network bandwidth utilization when the data is transmitted over a network, when accessed by the user, and in some instances, when there are longer and less efficient searching sessions between the user and the distributed data sources.

Accordingly, automated computing technology for programmatically parallelizing distributed graph queries of a graph metaphor of distributed data sources by determining a parallelized query plan from properties stored with respect to a graph metaphor, as provided herein, can be beneficial for enabling improved computing applications and an improved user computing experience. For example, automated computing technology for programmatically parallelizing distributed graph queries of a graph metaphor of distributed data sources speeds up the query execution and reduces the latency and/or computing and networking resources utilized during search query operations of a graph metaphor of distributed data sources by facilitating parallelization of the queries of the distributed data sources. The parallelization of the queries of the distributed data sources speeds up the query execution and reduces the latency and/or computing and networking resources utilized as the parallelized queries are simultaneously executed across the distributed data sources (e.g., and the corresponding database management system of each of the distributed data sources) allowing for simultaneous data retrieval operations and/or access control operations, thereby reducing the total response time to the query. In this regard, the speed of the query execution is increased, latency is decreased, and/or the computing and network resources are conserved. Further, embodiments of this disclosure address a need that arises from a very large scale of operations created by software-based services that cannot be managed by humans. The actions/operations described herein are not a mere use of a computer, but address results of a system that is a direct consequence of software used as a service offered in conjunction with user communication through services hosted across a variety of platforms and devices. Further still, embodiments of this disclosure enable an improved user experience across a number of computer devices, applications, and platforms. Further still, embodiments described herein enable the programmatic parallelizing of distributed graph queries of a graph metaphor of distributed data sources without requiring computer tools and resources for a user to manually perform operations to produce this outcome. In this way, some embodiments, as described herein, reduce or eliminate a need for certain data sources, data storage, and computer controls for enabling manually performed steps by an administrator, or the user themselves, to search, identify, assess, and configure (e.g., by hard-coding) specific, static data, thereby reducing the consumption of computing resources.

Additional Description of the Embodiments

Turning now to FIG. 1, a block diagram is provided showing an example operating environment 100 in which some embodiments of the present disclosure may be employed. It should be understood that this and other arrangements described herein are set forth only as examples. Other arrangements and elements (e.g., machines, interfaces, functions, orders, and groupings of functions) can be used in addition to or instead of those shown, and some elements may be omitted altogether for the sake of clarity. Further, many of the elements described herein are functional entities that may be implemented as discrete or distributed components or in conjunction with other components, and in any suitable combination and location. Various functions described herein as being performed by one or more entities may be carried out by hardware, firmware, and/or software. For instance, some functions may be carried out by a processor executing instructions stored in memory.

Among other components not shown, example operating environment 100 includes a number of user computing devices, such as: user devices 102a and 102b through 102n; a number of data sources, such as data sources 104a and 104b through 104n; server 106; sensors 103a and 107; and network 110. It should be understood that environment 100 shown in FIG. 1 is an example of one suitable operating environment. Each of the components shown in FIG. 1 may be implemented via any type of computing device, such as computing device 700 described in connection to FIG. 7, for example. These components may communicate with each other via network 110, which may include, without limitation, one or more local area networks (LANs) and/or wide area networks (WANs). In exemplary implementations, network 110 comprises the Internet and/or a cellular network, amongst any of a variety of possible public and/or private networks.

It should be understood that any number of user devices, servers, and data sources may be employed within operating environment 100 within the scope of the present disclosure. Each may comprise a single device or multiple devices cooperating in a distributed environment. For instance, server 106 may be provided via multiple devices arranged in a distributed environment that collectively provide the functionality described herein. Additionally, other components not shown may also be included within the distributed environment.

User devices 102a and 102b through 102n can be client user devices on the client-side of operating environment 100, while server 106 can be on the server-side of operating environment 100. Server 106 can comprise server-side software designed to work in conjunction with client-side software on user devices 102a and 102b through 102n so as to implement any combination of the features and functionalities discussed in the present disclosure. This division of operating environment 100 is provided to illustrate one example of a suitable environment, and there is no requirement for each implementation that any combination of server 106 and user devices 102a and 102b through 102n remain as separate entities.

User devices 102a and 102b through 102n may comprise any type of computing device capable of use by a user. For example, in one embodiment, user devices 102a through 102n may be the type of computing device described in relation to FIG. 7 herein. By way of example and not limitation, a user device may be embodied as a personal computer (PC), a laptop computer, a mobile or mobile device, a smartphone, a smart speaker, a tablet computer, a smart watch, a wearable computer, a personal digital assistant (PDA) device, a music player or an MP3 player, a global positioning system (GPS) or device, a video player, a handheld communications device, a gaming device or system, an entertainment system, a vehicle computer system, an embedded system controller, a camera, a remote control, an appliance, a consumer electronic device, a workstation, any other suitable computer device, or any combination of these delineated devices.

Data sources 104a and 104b through 104n may comprise data sources and/or data systems, which are configured to make data available to any of the various constituents of operating environment 100 or system 200 described in connection to FIG. 2. For instance, in one embodiment, one or more data sources 104a through 104n provide (or make available for accessing), to graph configuration component 240 of FIG. 2, data through data source accessing components 260 to generate a graph metaphor of graph configuration component 240 representing data sources 104a through 104n through plug-ins for each of the data sources of data source accessing components 260, such as rest APIs, SQL database plug-ins, graph database plug-ins, search engine plug-ins, and/or any other plug-in for any type of data source. In one embodiment, one or more data sources 104a through 104n provide (or make available for accessing), to query results component 270 of FIG. 2, data through data source accessing components 260 by executing parallelized distributed queries of the query candidates through plug-ins for each of the data sources of data source accessing components 260, such as rest APIs, SQL database plug-ins, graph database plug-ins, search engine plug-ins, and/or any other plug-in for any type of data source. Data sources 104a and 104b through 104n may be discrete from user devices 102a and 102b through 102n and server 106 or may be incorporated and/or integrated into at least one of those components.

Figure 2:
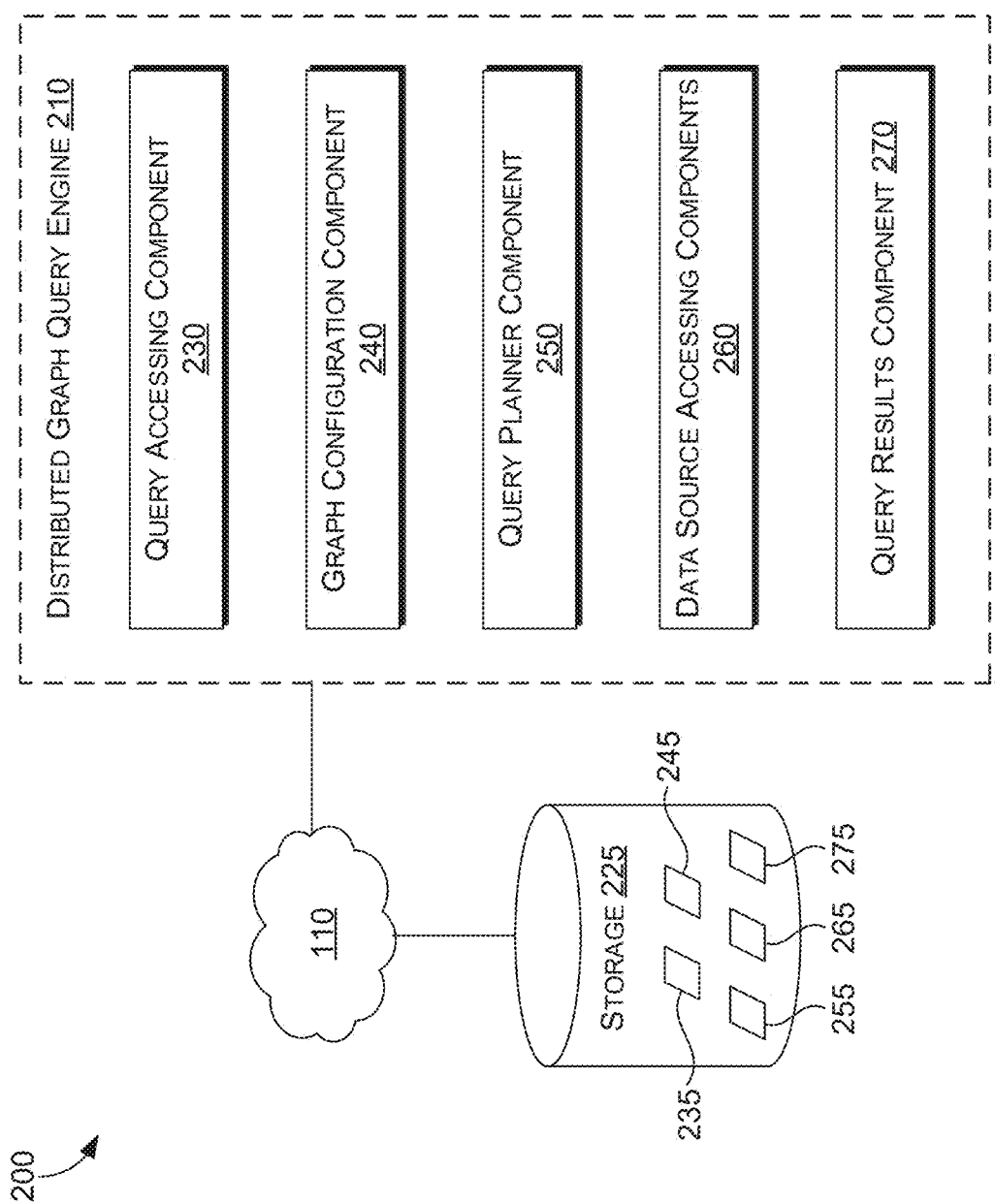
FIG. 2 is a diagram depicting an example computing architecture suitable for implementing aspects of the present disclosure.
Figure 3:
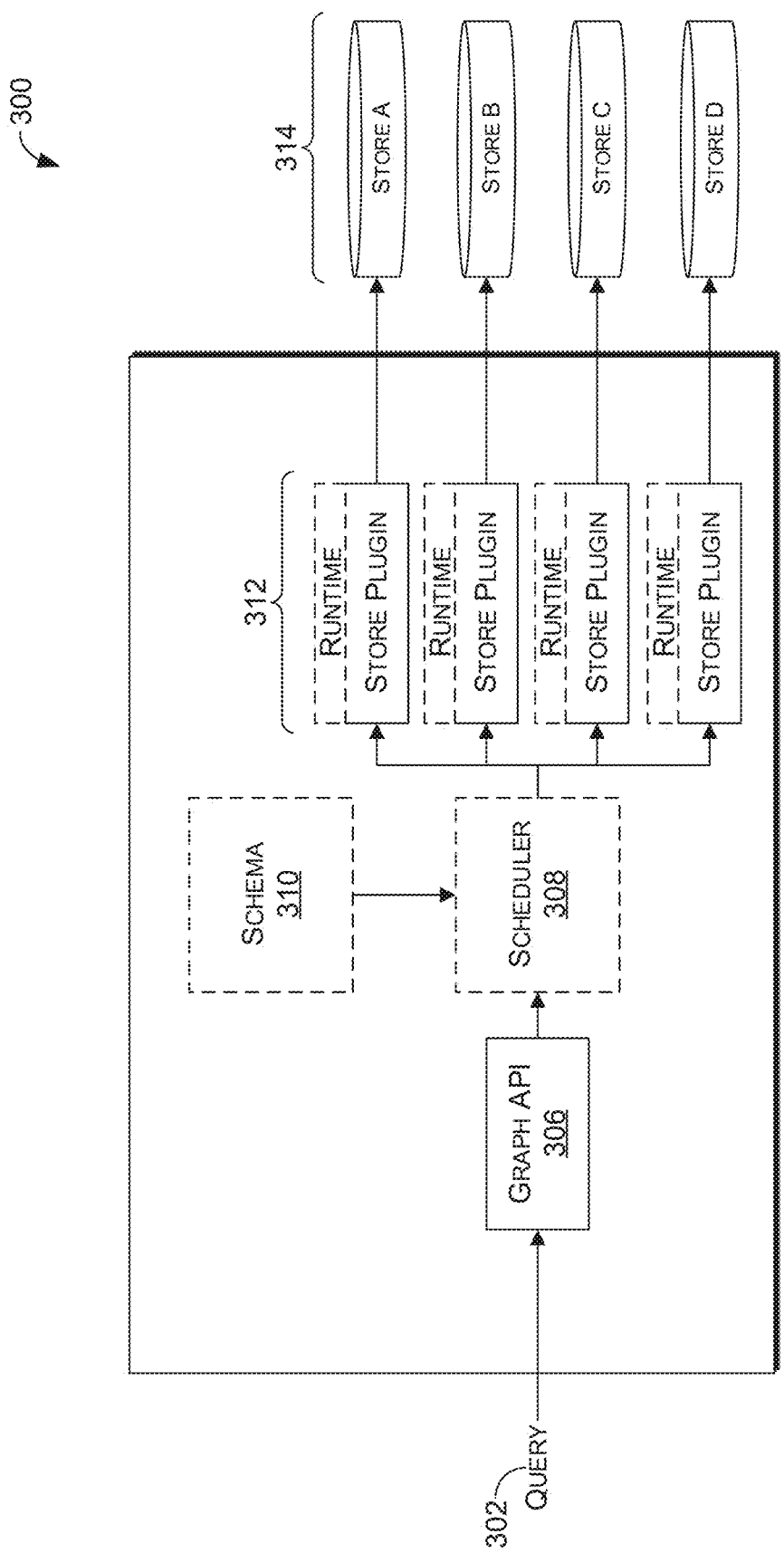
FIG. 3 illustratively depicts an example diagram to programmatically parallelize distributed graph queries of a graph metaphor of distributed data sources, in accordance with an embodiment of the present disclosure.

Operating environment 100 can be utilized to implement one or more of the components of system 200, described in FIG. 2 and diagram 300 of FIG. 3. Operating environment 100 can also be utilized for implementing aspects of methods 500 and 600 in FIGS. 5-6, respectively.

Referring now to FIG. 2, with continuing reference to FIG. 1, a block diagram is provided showing aspects of an example computing system architecture suitable for implementing an embodiment of this disclosure and designated generally as system 200. System 200 represents only one example of a suitable computing system architecture. Other arrangements and elements can be used in addition to or instead of those shown, and some elements may be omitted altogether for the sake of clarity. Further, as with operating environment 100, many of the elements described herein are functional entities that may be implemented as discrete or distributed components or in conjunction with other components, and in any suitable combination and location.

Example system 200 includes network 110, which is described in connection to FIG. 1, and which communicatively couples components of system 200, including distributed graph query engine 210, and storage 225. Distributed graph query engine 210 communicatively couples components of system 200 including query accessing component 230, graph configuration component 240, query planner component 250, data source accessing components 260, and query results component 270, which may be embodied as a set of compiled computer instructions or functions, program modules, computer software services, or an arrangement of processes carried out on one or more computer systems, such as computing device 700, described in connection to FIG. 7, for example.

In one embodiment, the functions performed by components of system 200 are associated with one or more computer applications, services, or routines, such as a search application. The functions may operate to programmatically parallelize distributed graph queries of a graph metaphor of distributed data sources, or otherwise to provide an enhanced computing experience for the user. In particular, such applications, services, or routines may operate on one or more user devices (such as user device 102a) or servers (such as server 106). Moreover, in some embodiments, these components of system 200 may be distributed across a network, including one or more servers (such as server 106) and/or client devices (such as user device 102a) in the cloud, such as described in connection with FIG. 8, or may reside on a user device, such as user device 102a. Moreover, these components, functions performed by these components, or services carried out by these components may be implemented at appropriate abstraction layer(s) such as the operating system layer, application layer, hardware layer, etc., of the computing system(s). Alternatively, or in addition, the functionality of these components and/or the embodiments described herein can be performed, at least in part, by one or more hardware logic components. For example, and without limitation, illustrative types of hardware logic components that can be used include Field-Programmable Gate Arrays (FPGAs), Application-Specific Integrated Circuits (ASICs), Application-Specific Standard Products (ASSPs), System-on-a-Chip systems (SOCs), Complex Programmable Logic Devices (CPLDs), etc. Additionally, although functionality is described herein with regard to specific components shown in example system 200, it is contemplated that in some embodiments, functionality of these components can be shared or distributed across other components.

Continuing with FIG. 2, query accessing component 230 is generally configured to access or receive a query, such as through user device 102*a* through 102*n* of FIG. 1. In some embodiments, data source accessing components 260 may be employed to facilitate the accessing of a query for query planner component 250. The data may be received (or accessed), and optionally reformatted, and/or combined, by query accessing component 230 and stored in one or more data stores such as storage 225, where it may be available to other components of system 200.

Some embodiments of query accessing component 230 utilize query accessing logic 235 stored in storage 225 to access or receive a query. In particular, utilizing query accessing logic 235 may comprise computer instructions including rules, conditions, associations, classification models, or other criteria for, among other operations, accessing or receiving a query. Query accessing logic 235 may take different forms, depending on the particular information items being determined, extracted, and/or processed. For example, query accessing logic 235 may comprise a set of rules, such as Boolean logic, various decision trees (e.g., random forest, gradient boosted trees, or similar decision algorithms), conditions or other logic, fuzzy logic, neural network, finite state machine, support vector machine, machine-learning techniques, such as a language model, or combinations of these to access or receive (or facilitate accessing or receiving) queries.

Continuing with FIG. 2, graph configuration component 240 is generally responsible for generating a graph metaphor representing a plurality of data sources 104*a*-104*n* of FIG. 1, such as distributed databases, data stores, services, applications, and/or others. Embodiments of graph configuration component 240 generate a graph metaphor based on data collected by data source accessing components 260. The graph metaphor generated by graph configuration component 240 can be accessed by query planner component 250. The graph metaphor generated by graph configuration component 240 may be stored in storage 225, where it may be used by other components or subcomponents of system 200.

Embodiments of graph configuration component 240 may generate a graph metaphor representing a plurality of data sources 104*a*-104*n* of FIG. 1. In this regard, each data source of data sources 104*a*-104*n* of FIG. 1 can be optimized to store different types of data. The graph metaphor generated by graph configuration component 240 models entities of the plurality of data sources and relationships between the entities to provide semantic connections between the data of the plurality of data sources to abstract complex relationships into a more manageable form for graph-based operations without sacrificing the optimization of each of the plurality of data sources 104*a*-104*n*. In some embodiments, the graph metaphor generated by graph configuration component 240 corresponds to a federated logical graph representing heterogeneous stores of a federated database system.

The graph metaphor generated by graph configuration component 240 includes nodes representing entities of the plurality of data sources (e.g., heterogeneous stores of a federated database system) and edges representing relationships between the nodes. The graph metaphor generated by graph configuration component 240 stores properties of the nodes and edges based on a corresponding type of entity and type of relationship, respectively. The node properties include descriptive attributes describing the entity, such as metadata indicating name and data source location of the entity, and/or query properties indicating constraints when querying the entity. In this regard, for a node representing data of a data source 104*a* of FIG. 1, only the node properties are stored in the graph metaphor generated by graph configuration component 240 while the data itself (for example, the content) is stored in the data source 104*a* of FIG. 1. The edge properties include descriptive attributes describing the relationship, such as metadata indicating a time when the relationship was created, and/or query properties indicating constraints when querying the edge, such as through an edge traversal. Examples of query properties include an indication of available identifiers that can be used to query an entity, such as the type of descriptive identifier supported by a data source; an indication of available query functions, such as whether the entity can support edge traversal, a lookup of a node by ID, a search function, and/or any other query function; access requirements, such as requiring a call to a security service to confirm access to data for the user; and/or any other properties that indicate constraints when querying.

Some embodiments of graph configuration component 240 utilize graph configuration logic 245 stored in storage 225 to generate a graph metaphor. In particular, graph configuration logic 245 may comprise computer instructions including rules, conditions, associations, classification models, or other criteria for, among other operations, generating a graph metaphor. Graph configuration logic 245 may take different forms, depending on the particular information items being determined, extracted, and/or processed. For example, graph configuration logic 245 may comprise a set of rules, such as Boolean logic, various decision trees (e.g., random forest, gradient boosted trees, or similar decision algorithms), conditions or other logic, fuzzy logic, neural network, finite state machine, support vector machine, machine-learning techniques, such as a language model, or combinations of these to generate (or facilitate generating) a graph metaphor.

Continuing with FIG. 2, query planner component 250 is generally responsible for determining a parallelized query plan. Embodiments of query planner component 250 may determine a parallelized query plan based on the query accessed by query accessing component 230 and the graph metaphor generated by graph configuration component 240. Thus, information about the query accessed by query accessing component 230, and the graph metaphor generated by graph configuration component 240 may be accessed by query planner component 250 in storage 225. The data of the parallelized query plan generated by query planner component 250 may be stored in storage 225, where it may be used by other components or subcomponents of system 200.

Embodiments of query planner component 250 may access or receive a graph query and parse the graph query to determine a representation of query candidates from the graph metaphor generated by graph configuration component 240. The query candidates correspond to entities, such as data sources and/or regions of the federated database system, and/or relationships that will need to be queried by data source accessing components 260 in order to determine a response to the graph query for presentation by query results component 270. For example, a user inputs a query for data, and the query is accessed by query accessing component 230. A query is applied to the graph metaphor generated by graph configuration component 240 as a graph query utilizing any known graph querying technique. The representation of query candidates corresponding to each node and/or edge of the graph metaphor of graph configuration component 240 that will need to be queried in order to determine a response to the graph query is determined by query planner component 250.

The query properties of each of the query candidates are used to determine a query plan by query planner component 250. The query plan determined by query planner component 250 includes a set of query steps to be performed in order to query each of the query candidates. A parallelized query plan is determined by query planner component 250 based on the set of query steps. The parallelized query plan is executed by executing parallelized distributed queries of the query candidates by data source accessing components 260 through plug-ins for each of the data sources 104a-104n of FIG. 1. Additional examples of programmatically parallelizing distributed graph queries of a graph metaphor of distributed data sources are described in connection with FIGS. 3 and 4A-4D.

In some embodiments, the parallelized query plan is determined by query planner component 250 based on latency, cost, reliability, and/or other similar factors, such as through statistics, rules, and/or heuristics. In some embodiments, a machine learning model is used by query planner component 250 to determine the parallelized query plan based on available metrics, such as expected performance gain due to parallelization, the cost in terms of CPU utilization, memory consumption, or computational cost, statistics on how frequently the result of executing the access control logic is positive, and/or any other factors.

Some embodiments of query planner component 250 utilize query planner logic 255 stored in storage 225 to determine a parallelized query plan. In particular, query planner logic 255 may comprise computer instructions including rules, conditions, associations, classification models, or other criteria for, among other operations, determining a parallelized query plan, or any of the embodiments described herein. Query planner logic 255 may take different forms, depending on the particular information items being determined, extracted, and/or processed. For example, query planner logic 255 may comprise a set of rules, such as Boolean logic, various decision trees (e.g., random forest, gradient boosted trees, or similar decision algorithms), conditions or other logic, fuzzy logic, neural network, finite state machine, support vector machine, machine-learning techniques, or combinations of these to determine (or facilitate determining) a parallelized query plan according to embodiments described herein.

Continuing with FIG. 2, data source accessing components 260 are generally responsible for accessing each of the data sources 104a-104n of FIG. 1 used to generate the graph metaphor of graph configuration component 240. Embodiments of data source accessing components 260 receive instructions to access data from each of the data sources 104a-104n by query planner component 250 and/or graph configuration component 240. Thus, information regarding a parallelized query plan generated by query planner component 250 may be accessed by data source accessing components 260 in storage 225. The data accessed from data sources 104a-104n of FIG. 1 by data source accessing components 260 may be stored in storage 225, where it may be used by other components or subcomponents of system 200.

Embodiments of data source accessing components 260 may access data stored in data sources 104a-104n in order to execute the distributed queries of the parallelized query plan determined by query planner component 250 through plug-ins for each of the data sources 104a-104n of FIG. 1.

Some embodiments of data source accessing components 260 utilize data source accessing logic 265 stored in storage 225 to access data sources 104a-104n of FIG. 1. In particular, data source accessing logic 265 may comprise computer instructions including rules, conditions, associations, classification models, or other criteria for, among other operations, accessing data sources 104a-104n of FIG. 1. Data source accessing logic 265 may take different forms, depending on the particular processing of accessing data sources 104a-104n of FIG. 1. For example, data source accessing logic 265 may comprise a set of rules, such as Boolean logic, various decision trees (e.g., random forest, gradient boosted trees, or similar decision algorithms), conditions or other logic, fuzzy logic, neural network, finite state machine, support vector machine, machine-learning techniques, or combinations of these to access data sources 104a-104n of FIG. 1 according to embodiments described herein.

Continuing with FIG. 2, query results component 270 is generally responsible for determining a query result from the parallelized distributed queries of each of the data sources 104a-104n of FIG. 1 by data source accessing components 260 through the parallelized query plan of query planner component 250. Embodiments of query results component 270 may determine a query result based on data accessed by data source accessing components 260. Thus, information regarding the data accessed by data source accessing components 260 may be accessed by query results component 270 in storage 225. The data generated by query results component 270 may be stored in storage 225, where it may be used by other components or subcomponents of system 200.

Embodiments of query results component 270 may determine a query result from the parallelized distributed queries of each of the data sources 104a-104n of FIG. 1 by data source accessing components 260 through the parallelized query plan of query planner component 250. For example, the results from execution of each of the parallelized distributed queries are combined by query results component 270, such as through a conflate operation and/or de-duplicating redundant data. The query result is then presented to the user by query results component 270 in response to the query through a display screen of a user device, such as user devices 102a-102n of FIG. 1.

With reference now to FIG. 3, an example diagram to programmatically parallelize distributed graph queries of a graph metaphor of distributed data sources is illustratively depicted, in accordance with an embodiment of the present disclosure. The diagram 300 shown in FIG. 3 can be utilized to programmatically parallelize distributed graph queries of a graph metaphor of distributed data sources, such as described in connection with the components of system 200 of FIG. 2.

As shown in FIG. 3, diagram 300 shows an example distributed graph query engine capable of collecting disconnected semantically linked data into a single coherent graph abstraction through schema 310. Generally, schema 310 (for example, a graph metaphor generated by graph configuration engine 240 of FIG. 2) describes the connectedness of the graph and pointers to individual stores of stores 314 (for example, data sources 104a-104n of FIG. 1), and each entity in the graph is stored in a partially overlapping number of stores. Generally, runtime 312 (for example, data source accessing components 260 of FIG. 2) includes a collection of retrieval plug-ins and is capable of returning the respective store data. Generally, scheduler 308 is capable of transforming a query 302 as received by graph API 306 (for example, query accessing component 230 of FIG. 2) into a collection of retrieval operations to individual stores 314 based on schema 310.

Schema 310 is a component that describes the logical layout and interconnectedness of the distributed data that together constitutes the single logical graph. In addition to describing which data can be found in the various services/ stores, it also captures concepts such as which identifiers can be used to query said data, and which query capabilities exist (edge traversal, lookup of a node by ID, search, etc.). Schema 310 can capture implicit data dependencies such as security context or other access tokens. Schema 310 can capture existing patterns for describing delegate access requirements more explicitly, making it possible to describe under which circumstances access control logic dependencies must be satisfied. For example, a single store might support retrieval of a multitude of different node/edge types along with a plethora of properties for these. Access control logic dependencies might be relevant only for a subset of these node/edge types and/or properties, and the schema can encode this. Furthermore, some of these logic dependencies might be conditional and encoded onto the data through specific property values.

An example of a schema declaration of token data dependency of schema 310 includes as follows:

```
[SchemaEndpoint(StorageTag="MyStore",
    TokenDependency="GMT")]
public class MyStoreSchemaDefinition
{
    ... Schema Contents for MyStore ...
}
```

In this example, the store/service has a token (data) dependency on a specific token named GMT. It should be noted that the same TokenDependency syntax can be applied to nodes, edges, and properties.

Another example of a schema declaration of logic dependency for a specific node type of schema 310 includes as follows:

```
[SchemaEndpoint(StorageTag="MyStore")]
public class MyStoreSchemaDefinition
{
    [SchemaEntity
        (ResolvedBy="ResolvingStore.Resolving-
        Method", ... )]
    public Document Document {get; set;}
}
```

In this example, the Document entity (a node) has an access control logic dependency, ResolvingMethod, that can be found in the ResolvingStore service.

Another example of a schema declaration of logic dependency for a specific edge type of schema 310 includes as follows:

```
[SchemaEndpoint(StorageTag="MyStore")]
public class MyStoreSchemaDefinition
{
    [SchemaRelationship(ResolvedBy="Store.
        Method", ... )]
    public ViewRelationship View {get; set;}
}
```

In this example, the View relationship (an edge) has an access control logic dependency, Method, that can be found in Store.

Another example of a schema declaration of logic dependency for a specific property of schema 310 includes as follows:

```
public class Document
{
    [SchemaProperty
        (ResolvedBy="SecurityService.TrimContent", ... )]
    public string Text {get; set;}
}
```

In this example, the Text property of the Document node type has an access control logic dependency, TrimContent, that can be found in the SecurityService. In some embodiments, this pattern could be used to declare an access control logic dependency for a property present on an edge.

One example of a schema declaration of logic dependency dependent on runtime conditional of schema 310 includes as follows:

```
public class Document
{
    [SchemaProperty( ... )]
    public bool NeedsExtraTrim {get; set;}
    ...
}
[SchemaEndpoint(StorageTag="MyStore")]
public class MyStoreSchemaDefinition
{
    [SchemaEntity
        (ConditionalResolvedBy="ResolvingStore.Resolving-
        Method",
        ConditionalResolvedWhen
            (this.Document.NeedsExtraTrim==true))]
    public Document Document {get; set;}
}
```

In this example, the NeedsExtraTrim property in the Document class is a Boolean value encoding whether extra access control business logic must be executed or not. The Document entity itself of the store schema definition is annotated to capture which access control logic should be executed (ResolvingStore.ResolvingMethod), and under which conditions this should happen (this.Document.NeedsExtraTrim==true). In some embodiments, the condition under which this extra trimming should occur can be expressed in C# code. In some embodiments, any conditional can be expressed, including conditions over multiple properties and execution of methods and library functionality and other means of declaring the conditionals could be used, such as declaration in different languages, pointer to functions, value indicating one or multiple hard-coded conditions, and/or others.

Arbitrary policies on conditioned access control of a graph object can be expressed. In some embodiments, a differential private aggregate operation is included over a set of objects that requires that the sample size be larger than a threshold value X for it to be considered anonymous. For example, a policy can then be expressed as a predicate that counts the sample size:

```
[SchemaEntity
    (ConditionalResolvedBy="ResolvingStore.Resolving-
    Method",
    ConditionalResolvedWhen(count(this.Document)
        <=X)]
public Document Document {get; set;}
```

In this regard, an access control mechanism can be contingent on the sample size of a "Document" collection. This requires compilation to enforce a policy stating the obligatory presence of an aggregation operation in the query plan itself.

Continuing with FIG. 3, scheduler 308 transforms an input query to the sequence of discrete steps required to fulfill the query intent. Scheduler 308 leverages schema 310 to identify which stores/services 314 must be queried for data, and in which order this must happen.

An example of determining parallelized distributed queries by scheduler 308 by Parallel fetching of property data includes as follows:

MATCH (document:File) WHERE document. Id='<my id>
RETURN document.Property A, document.PropertyB In this example, the query is referencing a single node (document) by its ID, and retrieves two properties for this node. PropertyA originates from one data store while PropertyB originates from a second data store. In order to satisfy the request, both data stores must be interrogated and the results combined to form the final result. These data fetch operations can be executed in parallel.

An example of determining parallelized distributed queries by scheduler 308 by Parallel traversal of paths in the graph includes as follows:

MATCH (me:Me)-[:MODIFIED|MENTIONED_IN]→(doc:File)
RETURN doc.Title

In this example, the query is anchored in a single node (me), and two edge types are followed to get to a set of documents (doc) for which the Title property is returned. The MODIFIED edge is served from one data store, and the MENTIONED_IN edge is served from a second data store. In order to satisfy the request, both data stores must be interrogated and the results combined to form the final result. These data fetch operations can be executed in parallel.

An example of determining parallelized distributed queries by scheduler 308 by Parallel lookups followed by a union/join includes as follows:

MATCH (wordDocs:File) WHERE wordDocs.Id in $wordDocIds LIMIT 3
RETURN wordDocs.Title
UNION
MATCH (excelDocs:File) WHERE exelDocs.Id in $excelDocIds LIMIT 3
RETURN excelDocs.Title In this example, the query performs two separate lookups, one for word documents and another for excel files, before the union of the result sets is constructed and returned to the caller. The word documents is served from one data store, and the excel files from the second data store. In order to satisfy the request, both data stores must be interrogated and the results combined to form the final result. These data fetch operations can be executed in parallel.

An example of determining parallelized distributed queries by scheduler 308 by multiple anchors includes as follows:

MATCH (me:Me)-[r1:MODIFIED]→(doc:File)←[r2:MENTIONED_IN]-(person)
WHERE id(person)="<UserId>"
RETURN doc.Title In this example, this query fetches the respective edges from two separate stores. However, this query pattern exposes two separate starting points. In a sequential plan, the query can either start (anchor) using the Me entity, or the identifier expressed in the person ID predicate. A parallel plan can choose to start at both possible anchors and then perform a joint operation (conflate) on the common result found in the middle variable denoting the file entity. Depending on the individual cardinality of the individual edge types, a parallel plan may invoke more lookups than a sequential if the number of edges in r2 is greater than r1.

In some embodiments, the distributed logical graph of schema 310 spans a plethora of different data stores with different capabilities, data, and dependencies that must be satisfied in order to serve requests while performing access control checks. As an example, some of the stores in the ecosystem rely on up-front access control where data is trimmed according to access controls prior to being stored in the user's partition. For these stores, no access control is performed at query time, other than verifying that the caller indeed is the owner of the partition, such as through an actor token. Other stores, on the other hand, are tenant-wide, and the access control evaluation is applied at query time. To perform this check, the security context (for example, a token containing the security group memberships and access rights of the user) of the calling user is compared to the access controls of the individual data items to be returned. Data inaccessible to the user is trimmed away and never leaves the store.

An example of determining parallelized distributed queries by scheduler 308 through access control dependencies includes as follows:

MATCH (me:Me)-[:COLLABORATES_WITH]-(user)-[:MODIFIED]→(doc:File)
RETURN doc.Title In this example, Store A is capable of serving the COLLABORATES_WITH edge, and is of the user-partitioned kind requiring only an actor token. Store B is capable of serving the MODIFIED edge, and is of the tenant-wide variety requiring the calling user's security context. Both stores are capable of serving sufficient data to support federation between the two data stores (for example, IDs of the nodes can be resolved between the two).

Generally, the calling user is identified when performing a query and the actor token is available. As the second system must be interrogated to retrieve the MODIFIED edges, the security context of the caller must be obtained. When retrieving security context is considered separate from the graph query execution itself and is offloaded to the caller, the abstraction of a single logical graph is broken, as the caller needs to both understand and explicitly handle the different requirements of the various stores.

Here, scheduler 308 determines parallelized distributed queries by executing the fetching of the security context in parallel with the first part of the query—(me:Me)-[:COLLABORATES_WITH]-(user)—which also acts as a data dependency to the second part of the query. In this regard, scheduler 308 automatically identifies such access control-related data dependencies and applies parallelism to speed up query execution. Additionally, the query execution can be more easily monitored and managed, as the tokens are tracked as part of the query execution. In this regard, issues that may arise during the execution can be identified and addressed. In addition, modeling the tokens as data dependencies, the query execution can be more secure, as the tokens are not exposed to the callers, thus reducing the risk of malicious actors gaining access to sensitive information. Another benefit of this approach is that developer agility can be increased, as cognitive load and the number of integration points that the callers must relate to is reduced.

Another example of determining parallelized distributed queries by scheduler 308 through access control dependencies includes as follows:

MATCH (me:Me)-[:ACCESSED]→(sensitiveDoc:SensitiveFile)←[:MODIFIED]-(user)
RETURN sensitiveDoc.Title, user.Name In the previous example, parallelism is applied to access control data dependencies. In this example, parallelism is applied to a different type of access control dependency, namely logic that must be executed to identify whether a result indeed is accessible to the caller. In this example, determining whether or not access can be granted to the (sensitiveDoc) nodes actually requires two distinct operations: (1) Reading up the files from storage system A, which would include executing any built-in access control checks of storage system A, and (2) For each of the files, executing a secondary call to a separate access control service that will determine whether or not the file indeed can be accessed. This call requires the security context of the calling user.

The two operations can occur due to increasingly fine-grained access controls that are highly context sensitive (for example, this data can only be accessed from the corporate network and/or within working hours). When these are combined with user-partition-based storage systems, there might be cases where a data item is present in the user's partition because they generally have access to it, but these policies must be evaluated at query time.

Continuing with the example, the ACCESSED edges and (sensitiveDoc) nodes can be read from storage system A. MODIFIED edges and (user) nodes can be read from storage system B. Both stores are capable of serving sufficient data to support federation between the two (for example, IDs of the nodes can be resolved between the two).

Similar to the previous example, retrieving the caller's security context can be executed in parallel with reading the ACCESSED edges and (sensitiveDoc) nodes from store A. Following this initial part of the query, store B must be queried to retrieve the MODIFIED edges and (user) nodes. However, it is also necessary to determine whether the caller actually has access by interrogating the access control service. This, however, can happen in parallel with the call to service B. In this regard, parallelism can be implemented by scheduler 308 by pursuing parallel execution paths and ensuring the access control determination from required access control logic is respected.

Continuing with FIG. 3, runtime 312 is responsible for executing the compiled query plan from scheduler 308. Runtime 312 can perform operations of interpreting, executing, and evaluating the results from the individual query plan steps (for example, query results component 270 of FIG. 2).

In some embodiments, for automatic parallel graph query execution, scheduler 308 identifies which steps are independent of each other and transforms the original sequential graph execution plan into a parallel one based on these dependencies. Scheduler 308 takes each step of the sequential plan, and considering them pure functions with inputs and outputs, and identifies what is output and what is mutated based on the input. For example, in some embodiments, for store A and store B, a scheduler 308 determines whether queries can be run in parallel if (1) the input of store A does not intersect with the output of store B; (2) the input of store B does not intersect with the output of store A; (3) none of the input in store A is mutated in store B; and (4) none of the input in store B is mutated in store A. In this regard, in some embodiments, if all of the aforementioned cases hold, scheduler 308 merges these two discrete sequential steps into one parallel step for the runtime to execute in parallel.

In some embodiments, in the case of data dependencies, the query execution plan determined by scheduler 308 includes a backward dependency. For example, the required data (token) is never explicitly mentioned in the query text, but must be inferred from the schema 310 at query planning time. In some embodiments, the same dependency can be introduced by multiple parts of the same query. In some embodiments, scheduler 308 performs a forward pass to identify all data/token dependencies. Following this, scheduler 308 performs a secondary reverse pass, and the token dependency is propagated backwards towards the beginning of the plan such that parallelism is leveraged, and duplicate token fetch operations are collapsed. In some embodiments, scheduler 308 continues propagating the resolution of data dependencies as far as possible. In some embodiments, scheduler 308 propagates the token fetch operation to happen just in time to satisfy the first usage.

In some embodiments, executing access control logic can happen in parallel with fetching data for a specific data item. In this regard, four scenarios can occur based on the order the results (data fetch or access control logic execution) are returned to the query execution engine: (1) Data is returned first, and following this a positive response from the access control logic is returned. In this case, the data can be leveraged further in the query execution; (2) Data is returned first, and following this a negative response from the access control logic is returned. In this case, the data cannot be leveraged further in the query execution; (3) a positive response from the access control logic is returned first, and this is followed by the data. In this case, the data can be leveraged further in the query execution; and (4) a negative response from the access control logic is returned first, and this is followed by the data. In this case, the data cannot be leveraged further in the query execution.

In this regard, in some embodiments, in order to support parallel execution of data fetch and access control logic execution, any data subject to this execution mode remains "locked" until a positive access control logic response has been received. In this regard, a sandbox abstraction is used to house data that would fall within this class. For example, the sandbox provides access to its data through a simple get-interface. The sandbox implementation is responsible for validating that a positive access control logic determination has been received, and in the case where it has not, it will deny access and not return any data. An example of code for a sandbox implementation is as follows:

```
1 reference
public classs Sandbox : ISandbox
{
    0 references
    public Sandbox(IDataFetch dataFetch, IAccessControlLogic[ ] accessControlLogicInvocations)
    {
        this.data = data = dataFetch.FetchData( );
        this.accessGranted = false;
        foreach (var accessControlLogic in accessControlLogicInvocations)
        {
            var accessGrantedTmp = accessControlLogic.Invoke( );
            if (accessGrantedTmp == false)
            {
                return
            }
        }
        // All access control invocations successful
        this.accessGranted = accessGrantedTmp;
    }
    0 references
    public IValue GetData( )
    {
        if (this.accessGranted)
        {
            return this.data;
        }
        return NoAccessSentinel;
    }
}
```

In this example, if access turns out to not be granted to a data item, the query execution engine must update its state by invalidating the path through the graph. In some embodiments, in the case of access control logic that should be invoked conditionally, two options are available: (1) Execute the access control logic sequentially after evaluating the condition to be true, and (2) Execute the access control logic in parallel with fetching data and evaluating the condition. In some embodiments, the decision can also be made at query planning time based on statistics and rules/ heuristics over these. In some embodiments, a machine learned model can make this decision based on available metrics, such as expected performance gain due to parallelization, the cost in terms of CPU utilization, memory consumption, computational cost, statistics on how frequently the result of executing the access control logic is positive, and/or others.

With reference now to FIGS. 4A-4D, example diagrams of example parallelized query plans that are determined by programmatically parallelizing distributed graph queries of a graph metaphor of distributed data sources are illustratively depicted, in accordance with an embodiment of the present disclosure. The example diagrams of the example parallelized query plans of FIG. 4A-4D can be implemented, such as described in connection with the components of system 200 of FIG. 2 and diagram 300 of FIG. 3.

Figure 4A:
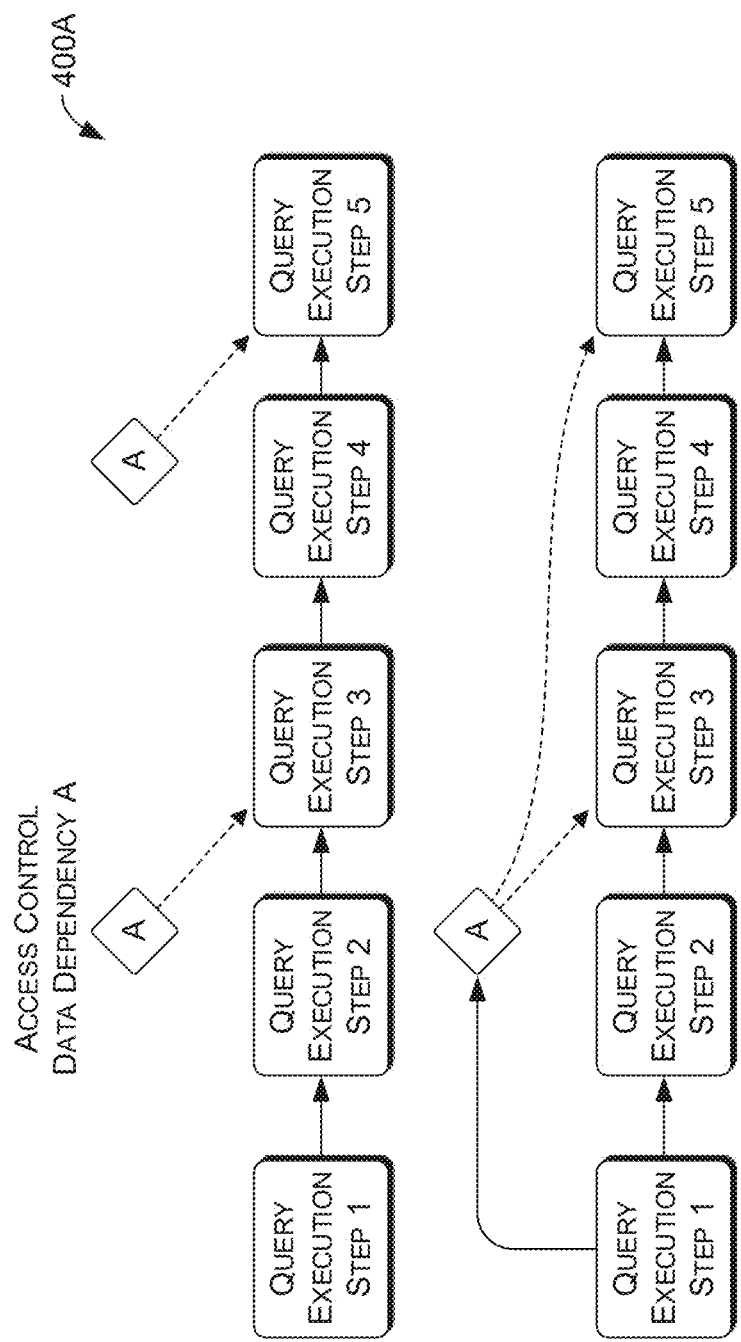
FIGS. 4A-4D illustratively depict example diagrams of example parallelized query plans that are determined by programmatically parallelizing distributed graph queries of a graph metaphor of distributed data sources, in accordance with an embodiment of the present disclosure.

With reference now to FIG. 4A, an example diagram 400A of an example parallelized query plan that is determined by programmatically parallelizing distributed graph queries of a graph metaphor of distributed data sources is illustratively depicted. As can be understood from diagram 400A, an example of multiple query execution steps having the same access control data dependency is shown. In the bottom row, these have been de-duplicated and replaced with a single fetch operation for the data, executed in parallel with Query Execution Step 2.

In some embodiments, executing the fetch operation does not necessarily mean executing it in parallel with the last preceding operation. For example, if expected latency of fetching the token is gathered either through run-time measurements, encoded in the schema, or otherwise available to the planner, this should be included when deciding where in the instruction stream to insert the token fetch operation.

Figure 4B:
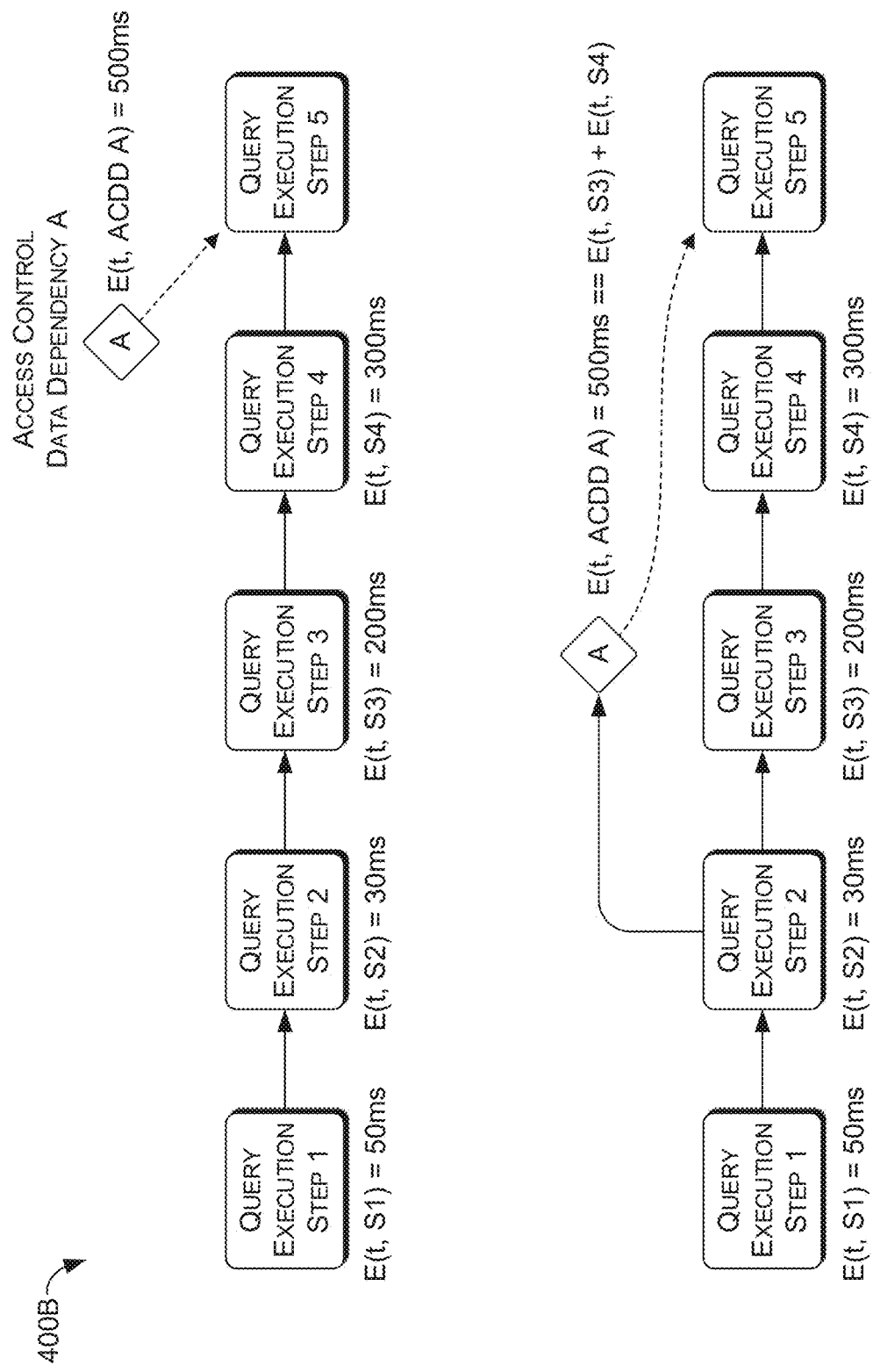

With reference now to FIG. 4B, an example diagram 400B of an example parallelized query plan that is determined by programmatically parallelizing distributed graph queries of a graph metaphor of distributed data sources is illustratively depicted. As can be understood from diagram 400B, an example of how an access control data dependency is pushed forwards in the plan based on estimated execution times of the various query execution steps is shown. The result is that the fetch operation completes just in time for its usage, rather than being executed in parallel with the last preceding step, or unnecessarily early in the query execution.

In some embodiments, it might be beneficial to retain duplicate token fetch operations in the query plan. As an example, in order to satisfy a query, the execution must be split up and performed in multiple geographical regions (this could happen for compliance reasons). The execution of the per-region subqueries can happen in parallel, and each of these has a dependency on the same access control data (token). In one example, the token is available only in the region where the query execution begins. In this case, it is likely beneficial to retrieve the token once, and pass it with each of the subqueries bound for the individual regions where query execution must occur.

Figure 4C:
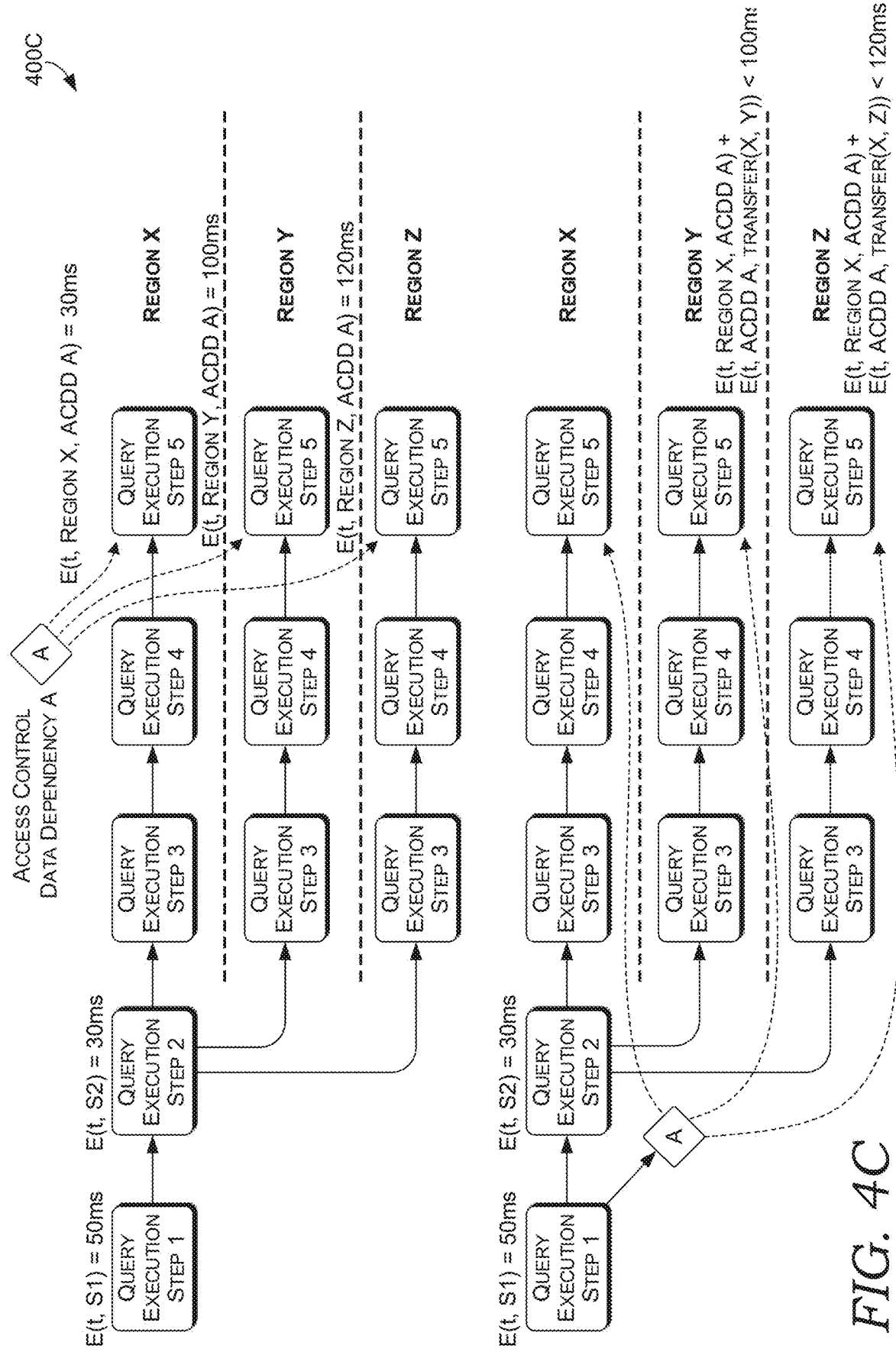

With reference now to FIG. 4C, an example diagram 400C of an example parallelized query plan that is determined by programmatically parallelizing distributed graph queries of a graph metaphor of distributed data sources is illustratively depicted. As can be understood from diagram 400C, an example of where, due to an access control data dependency only being accessible in a single region, it is beneficial to fetch this data only once and pass it along with subqueries bound for parallel execution in specific regions.

In some embodiments, the token is available through a geo-replicated service that has presence in all of the regions where the query execution must occur. In this case, it might be beneficial to include a token fetch operation in each of the region-specific subquery plans. This might yield better performance, especially if the token payload is large, since data transfer often is a significant latency driver-especially for long distance calls such as those that span geographical regions.

Figure 4D:
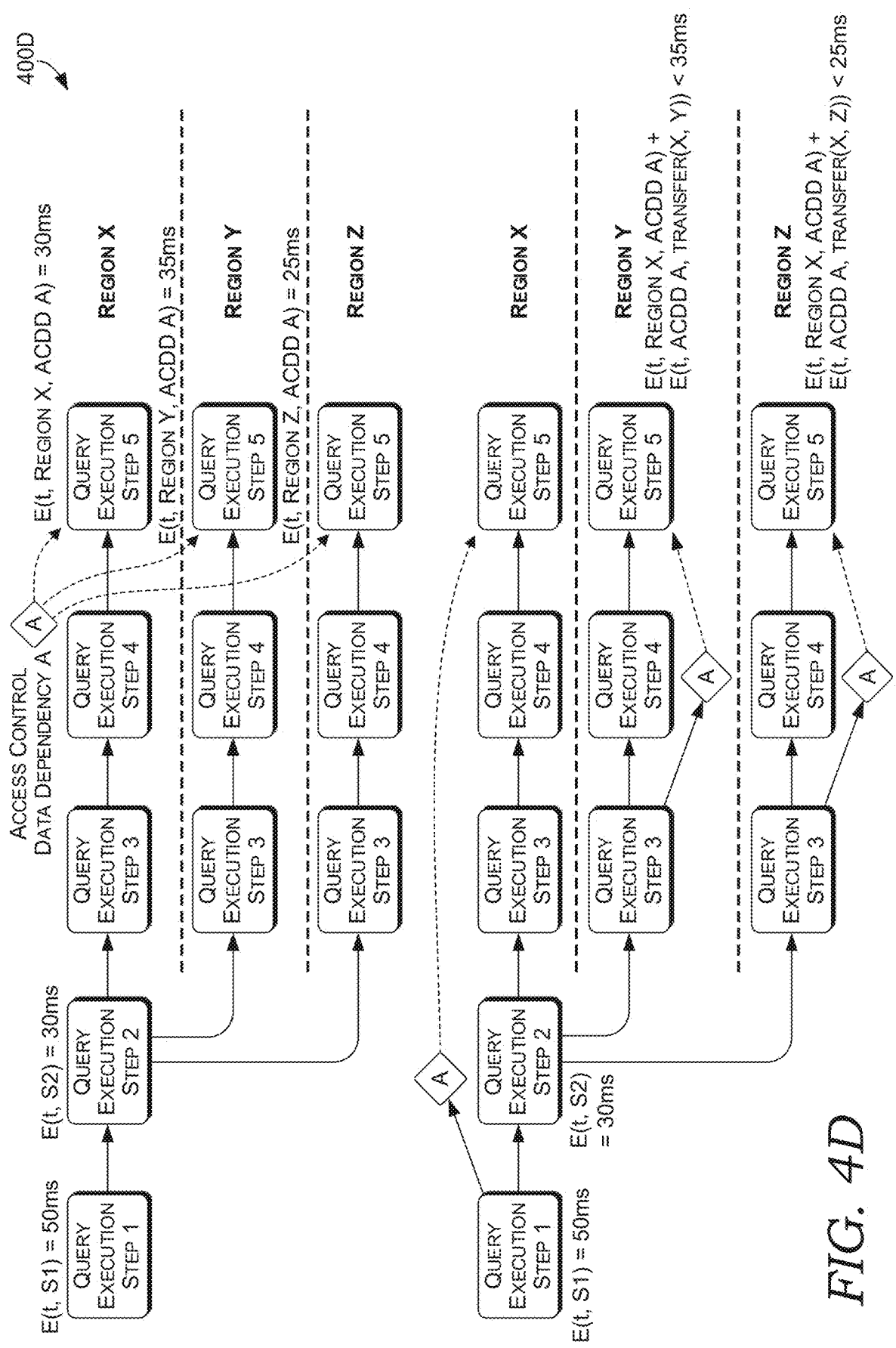

With reference now to FIG. 4D, an example diagram 400D of an example parallelized query plan that is determined by programmatically parallelizing distributed graph queries of a graph metaphor of distributed data sources is illustratively depicted. As can be understood from diagram 400D, an example of where, due to the access control data dependency being available with low latency within the individual regions, the query planner opts for including one fetch operation per parallel region subquery. These operations are executed in parallel with other in-region operations.

In some embodiments, hybrid cases might occur. For some regions it is beneficial to pass the token, while in others the best latency can be achieved by fetching the access control data dependency as part of the in-region subquery. In some embodiments, the query planner (for example, scheduler 308 of FIG. 3 and query planner component 250 of FIG. 2) can accommodate this by estimating the expected latency for the two options on a per-region basis and generating the execution plans accordingly.

Figure 5:
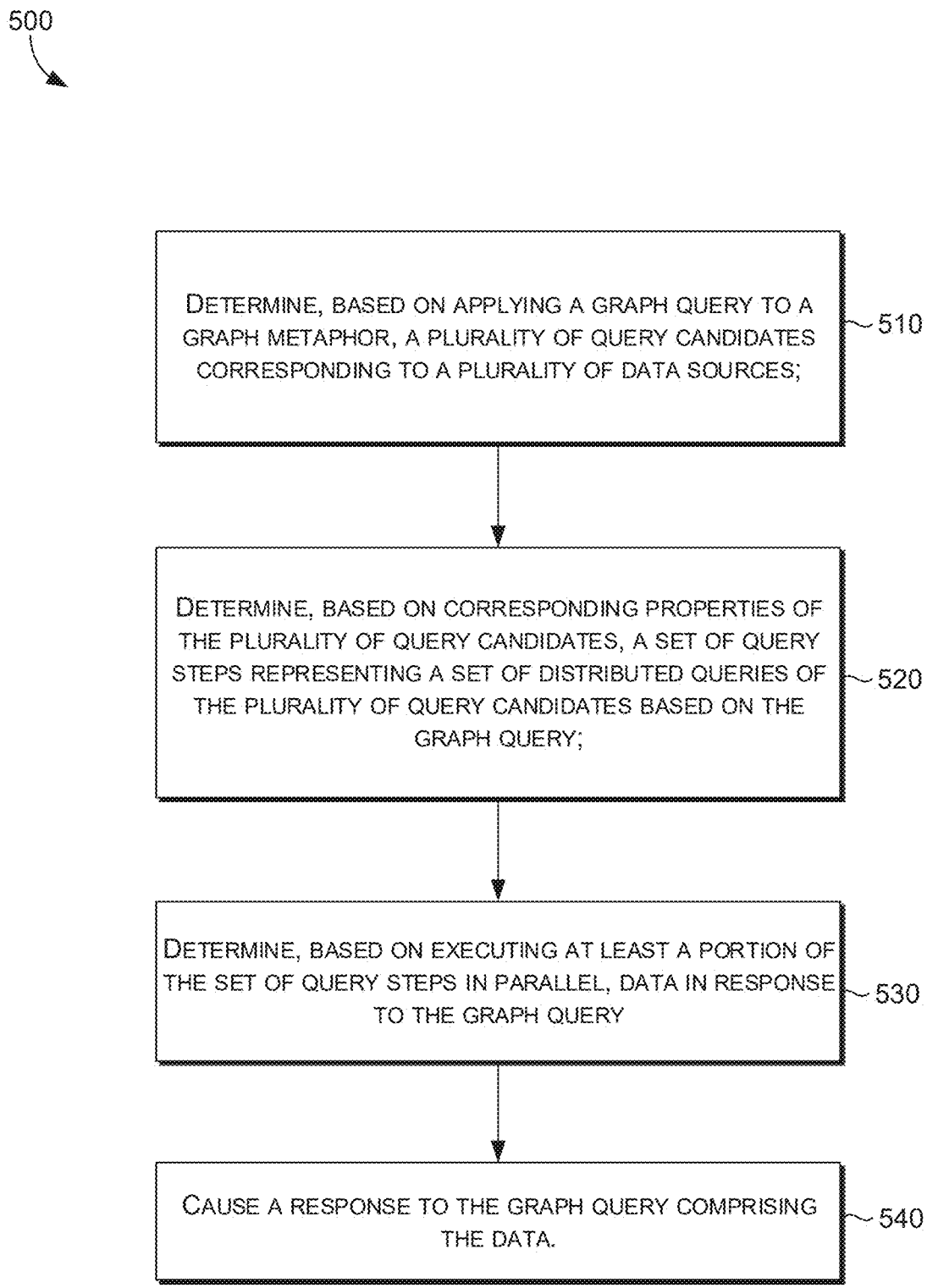
FIGS. 5-6 depict flow diagrams of methods for programmatically parallelizing distributed graph queries of a graph metaphor of distributed data sources, in accordance with an embodiment of the present disclosure.
Figure 6:
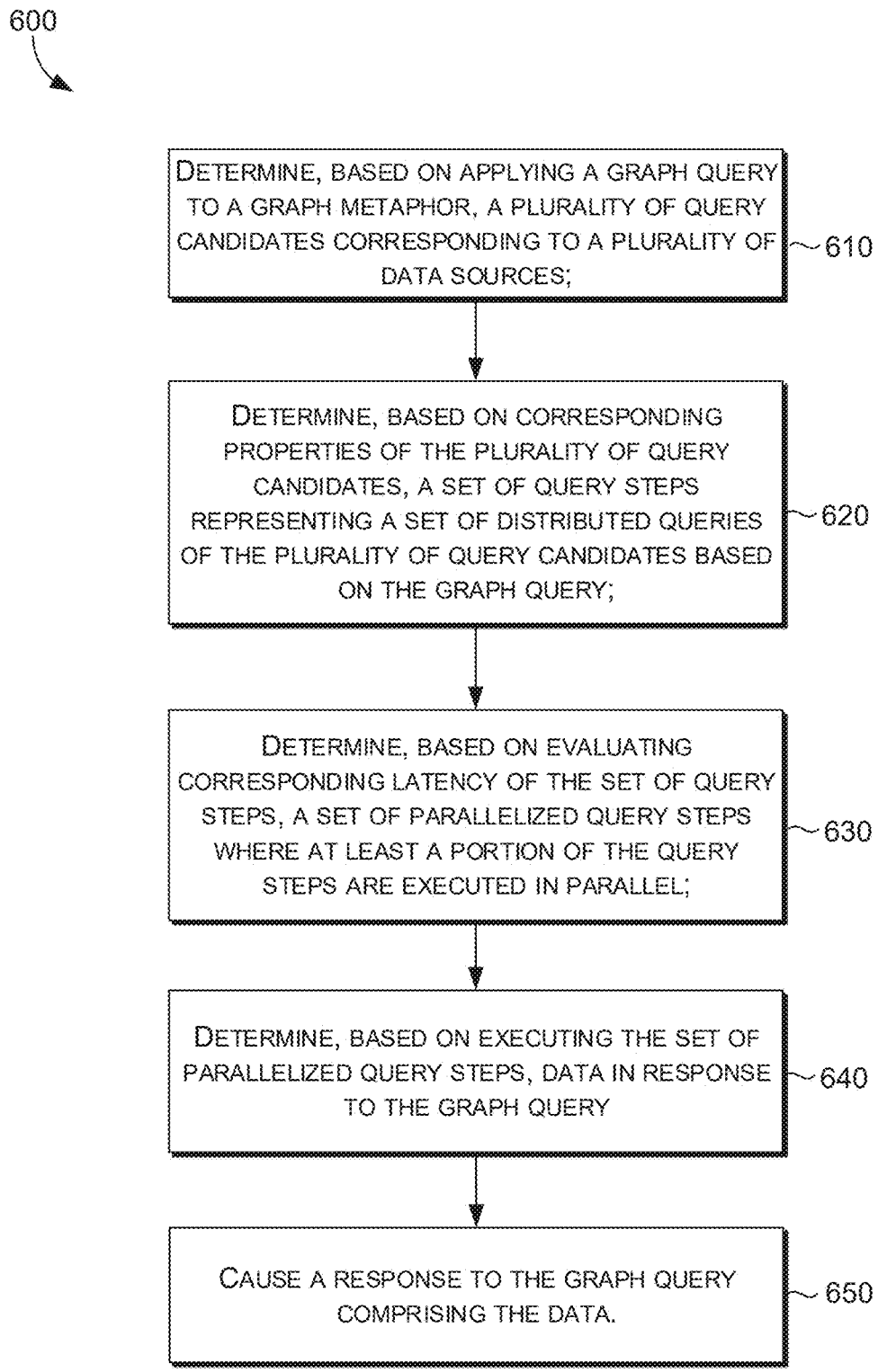

Turning now to FIGS. 5 and 6, aspects of example process flows 500 and 600 are illustratively depicted for some embodiments of the disclosure. Process flows 500 and 600 each may comprise a method (sometimes referred to herein as method 500 and method 600) that may be carried out to implement various example embodiments described herein. For instance, process flow 500 or process flow 600 may be performed to programmatically parallelize distributed graph queries of a graph metaphor of distributed data sources, which may be used to provide any of the improved electronic search technology or enhanced user computing experiences described herein.

Each block or step of process flow 500, process flow 600, and other methods described herein comprises a computing process that may be performed using any combination of hardware, firmware, and/or software. For instance, various functions may be carried out by a processor executing instructions stored in memory, such as memory 712 described in FIG. 7 and/or storage 225 described in FIG. 2. The methods may also be embodied as computer-usable instructions stored on computer storage media. The methods may be provided by a stand-alone application, a service or hosted service (stand-alone or in combination with another hosted service), or a plug-in to another product, to name a few. The blocks of process flow 500 and 600 that correspond to actions (or steps) to be performed (as opposed to information to be processed or acted on) may be carried out by one or more computer applications or services, in some embodiments, which may operate on one or more user devices (such as user device 102a), servers (such as server 106), and may be distributed across multiple user devices, and/or servers, or by a distributed computing platform, and/or may be implemented in the cloud, such as described in connection with FIG. 8. In some embodiments, the functions performed by the blocks or steps of process flows 500 and 600 are carried out by components of system 200, described in connection to FIG. 2.

With reference to FIG. 5, aspects of example process flow 500 are illustratively provided for programmatically parallelizing distributed graph queries of a graph metaphor of distributed data sources. In particular, example process flow 500 may be performed to programmatically parallelize distributed graph queries of a graph metaphor of distributed data sources, as described in connection with FIG. 2.

At block 510, method 500 includes determining, based on applying a graph query to a graph metaphor, a plurality of query candidates corresponding to a plurality of data sources. Some embodiments of block 510 comprise that each node of the graph metaphor comprises a corresponding node descriptive attribute and a corresponding node query property, and each edge of the graph metaphor comprises a corresponding edge descriptive attribute and a corresponding edge query property.

Some embodiments of block 510 comprise that the graph metaphor represents a plurality of data sources, such as distributed databases, data stores, services, application, and/or others, is stored. Each data source of the plurality of data sources can be optimized to store different types of data. The graph metaphor models entities of the plurality of data sources and relationships between the entities to provide semantic connections between the data of the plurality of data sources to abstract complex relationships into a more manageable form for graph-based operations without sacrificing the optimization of each of the plurality of data sources. In some embodiments, the graph metaphor corresponds to a federated logical graph representing heterogeneous stores of a federated database system.

Some embodiments of block 510 comprise that the graph metaphor includes nodes representing entities of the plurality of data sources (e.g., heterogeneous stores of a federated database system) and edges representing relationships between the nodes.

Some embodiments of block 510 comprise that the graph metaphor stores properties of the nodes and edges based on a corresponding type of entity and type of relationship, respectively. The node properties include descriptive attributes describing the entity, such as metadata indicating name and data source location of the entity, and/or query properties indicating constraints when querying the entity. In this regard, for a node representing data of a data source, only the node properties are stored in the graph metaphor while the data itself (for example, the content) is stored in the data source. The edge properties include descriptive attributes describing the relationship, such as metadata indicating a time when the relationship was created, and/or query properties indicating constraints when querying the edge, such as through an edge traversal. Examples of query properties include an indication of available identifiers that can be used to query an entity, such as the type of descriptive identifier supported by a data source; an indication of available query functions, such as whether the entity can support edge traversal, a lookup of a node by ID, a search function, and/or any other query function; access requirements, such as requiring a call to a security service to confirm access to data for the user; and/or any other properties that indicate constraints when querying.

Some embodiments of block 510 comprise that a graph query is received and parsed to determine a representation of query candidates from the graph metaphor. The query candidates correspond to entities, such as data sources and/or regions of the federated database system, that will need to be queried in order to determine a response to the graph query. For example, a user inputs a query for data and the query is received via an API of the graph metaphor. A query is applied to the graph metaphor as a graph query utilizing any known graph querying technique. The representation of query candidates corresponding to each node of the graph metaphor that will need to be queried in order to determine a response to the graph query is determined.

Some embodiments of block 510 comprise that the query properties of each of the query candidates are used to determine a query plan. The query plan includes a set of query steps to be performed in order to query each of the query candidates.

Embodiments of block 510 may be carried out using query accessing component 230 (FIG. 2), graph configuration component 240 (FIG. 2), query planner component 250 (FIG. 2), data source accessing components 260 (FIG. 2) and/or query results component 270 (FIG. 2), in some implementations. Additional details of embodiments of block 510, or for carrying out operations of block 510, are described in connection to FIG. 2. Moreover, examples of knowledge graphs that are utilized to programmatically parallelize distributed graph queries of a graph metaphor of distributed data sources according to some embodiments of block 510 are illustratively depicted in FIGS. 3 and 4A-4D and described further in connection with the drawings.

At block 520, method 500 includes determining, based on corresponding properties of the plurality of query candidates from the graph metaphor, a set of query steps representing a set of distributed queries of the plurality of query candidates. Some embodiments of block 520 comprise that at least one of the corresponding properties of the plurality of query candidates corresponds to an access control requirement, and wherein at least one of the set of query steps corresponds to the access control requirement.

Some embodiments of block 520 comprise that the query properties of each of the query candidates are used to determine a query plan. The query plan includes a set of query steps to be performed in order to query each of the query candidates.

Some embodiments of block 520 comprise that a parallelized query plan is determined based on the set of query steps in order to speed up execution of the query. The parallelized query plan is executed by executing parallelized distributed queries of the query candidates through plug-ins for each of the data sources, such as rest APIs, SQL database plug-ins, graph database plug-ins, search engine plug-ins, and/or any other plug-in for any type of data source.

Some embodiments of block 520 comprise that the parallelized query plan is determined based on latency, cost, reliability, and/or other similar factors, such as through statistics, rules, and/or heuristics. Some embodiments of block 520 comprise that a machine learning model is used to determine the parallelized query plan based on available metrics, such as expected performance gain due to parallelization, the cost in terms of CPU utilization, memory consumption, or computational cost, statistics on how frequently the result of executing the access control logic is positive, and/or any other factors.

Embodiments of block 520 may be carried out using query accessing component 230 (FIG. 2), graph configuration component 240 (FIG. 2), query planner component 250 (FIG. 2), data source accessing components 260 (FIG. 2) and/or query results component 270 (FIG. 2), in some implementations. Additional details of embodiments of block 520, or for carrying out operations of block 520, are described in connection to FIG. 2. Moreover, examples of knowledge graphs that are utilized to programmatically parallelize distributed graph queries of a graph metaphor of distributed data sources according to some embodiments of block 520 are illustratively depicted in FIGS. 3 and 4A-4D and described further in connection with the drawings.

At block 530, method 500 includes determining, based on executing at least a portion of the set of query steps in parallel, data in response to the graph query. Some embodiments of block 530 comprise that executing at least the portion of the set of query steps in parallel further comprises fetching two or more portions of data corresponding to two or more nodes of the graph metaphor from two or more of the plurality of data sources in parallel. Some embodiments of block 530 comprise that executing at least the portion of the set of query steps in parallel further comprises fetching two or more portions of data corresponding to two or more edges of the graph metaphor from two or more of the plurality of data sources in parallel. Some embodiments of block 530 comprise that executing at least the portion of the set of query steps in parallel further comprises determining an access control requirement to two or more of the plurality of data sources in parallel. Some embodiments of block 530 comprise that executing at least the portion of the set of query steps in parallel further comprises determining an access control requirement to one of the plurality of data sources in parallel with fetching a portion of the data from a different one of the plurality of data sources. Some embodiments of block 530 comprise that executing at least the portion of the set of query steps in parallel further comprises determining an access control requirement to one of the plurality of data sources in parallel with fetching a portion of the data from the one of the plurality of data sources, wherein the portion of the database is maintained in a sandbox environment until the access control requirement is met.

Some embodiments of block 530 comprise that a parallelized query plan is determined based on the set of query steps in order to speed up execution of the query. The parallelized query plan is executed by executing parallelized distributed queries of the query candidates through plug-ins for each of the data sources, such as rest APIs, SQL database plug-ins, graph database plug-ins, search engine plug-ins, and/or any other plug-in for any type of data source.

Some embodiments of block 530 comprise that the parallelized query plan is determined based on latency, cost, reliability, and/or other similar factors, such as through statistics, rules, and/or heuristics. Some embodiments of block 530 comprise that a machine learning model is used to determine the parallelized query plan based on available metrics, such as expected performance gain due to parallelization, the cost in terms of CPU utilization, memory consumption, or computational cost, statistics on how frequently the result of executing the access control logic is positive, and/or any other factors.

Some embodiments of block 530 comprise that a query result is determined from the parallelized distributed queries of each of the data sources. For example, the results from execution of each of the parallelized distributed queries are combined, such as through a conflate operation and/or de-duplicating redundant data.

Embodiments of block 530 may be carried out using query accessing component 230 (FIG. 2), graph configuration component 240 (FIG. 2), query planner component 250 (FIG. 2), data source accessing components 260 (FIG. 2), and/or query results component 270 (FIG. 2), in some implementations. Additional details of embodiments of block 530, or for carrying out operations of block 530, are described in connection to FIG. 2. Moreover, examples of knowledge graphs that are utilized to programmatically parallelize distributed graph queries of a graph metaphor of distributed data sources according to some embodiments of block 530 are illustratively depicted in FIGS. 3 and 4A-4D and are described further in connection with the drawings.

At block 540, method 500 includes causing a response to the graph query comprising the data. Some embodiments of block 540 comprise that a query result is determined from the parallelized distributed queries of each of the data sources. For example, the results from execution of each of the parallelized distributed queries are combined, such as through a conflate operation and/or de-duplicating redundant data. Some embodiments of block 540 comprise that the query result is then presented to the user in response to the query.

Embodiments of block 540 may be carried out using query accessing component 230 (FIG. 2), graph configuration component 240 (FIG. 2), query planner component 250 (FIG. 2), data source accessing components 260 (FIG. 2), and/or query results component 270 (FIG. 2), in some implementations. Additional details of embodiments of block 540, or for carrying out operations of block 540, are described in connection to FIG. 2. Moreover, examples of knowledge graphs that are utilized to programmatically parallelize distributed graph queries of a graph metaphor of distributed data sources according to some embodiments of block 540 are illustratively depicted in FIGS. 3 and 4A-4D and described further in connection with the drawings.

With reference to FIG. 6, aspects of example process flow 600 are illustratively provided for programmatically parallelizing distributed graph queries of a graph metaphor of distributed data sources. In particular, example process flow 600 may be performed to programmatically parallelize distributed graph queries of a graph metaphor of distributed data sources, as described in connection with FIG. 2.

At block 610, method 600 includes determining, based on applying a graph query to a graph metaphor, a plurality of query candidates corresponding to a plurality of data sources. Some embodiments of block 610 comprise that each node of the graph metaphor comprises a corresponding node descriptive attribute and a corresponding node query property, and each edge of the graph metaphor comprises a corresponding edge descriptive attribute and a corresponding edge query property.

Some embodiments of block 610 comprise that the graph metaphor represents a plurality of data sources, such as distributed databases, data stores, services, applications, and/or others, is stored. Each data source of the plurality of data sources can be optimized to store different types of data. The graph metaphor models entities of the plurality of data sources and relationships between the entities to provide semantic connections between the data of the plurality of data sources to abstract complex relationships into a more manageable form for graph-based operations without sacrificing the optimization of each of the plurality of data sources. In some embodiments, the graph metaphor corresponds to a federated logical graph representing heterogeneous stores of a federated database system.

Some embodiments of block 610 comprise that the graph metaphor includes nodes representing entities of the plurality of data sources (e.g., heterogeneous stores of a federated database system) and edges representing relationships between the nodes.

Some embodiments of block 610 comprise that the graph metaphor stores properties of the nodes and edges based on a corresponding type of entity and type of relationship, respectively. The node properties include descriptive attributes describing the entity, such as metadata indicating name and data source location of the entity, and/or query properties indicating constraints when querying the entity. In this regard, for a node representing data of a data source, only the node properties are stored in the graph metaphor while the data itself (for example, the content) is stored in the data source. The edge properties include descriptive attributes describing the relationship, such as metadata indicating a time when the relationship was created, and/or query properties indicating constraints when querying the edge, such as through an edge traversal. Examples of query properties include an indication of available identifiers that can be used to query an entity, such as the type of descriptive identifier supported by a data source; an indication of available query functions, such as whether the entity can support edge traversal, a lookup of a node by ID, a search function, and/or any other query function; access requirements, such as requiring a call to a security service to confirm access to data for the user; and/or any other properties that indicate constraints when querying.

Some embodiments of block 610 comprise that a graph query is received and parsed to determine a representation of query candidates from the graph metaphor. The query candidates correspond to entities, such as data sources and/or regions of the federated database system, that will need to be queried in order to determine a response to the graph query. For example, a user inputs a query for data and the query is received via an API of the graph metaphor. A query is applied to the graph metaphor as a graph query utilizing any known graph querying technique. The representation of query candidates corresponding to each node of the graph metaphor that will need to be queried in order to determine a response to the graph query is determined.

Some embodiments of block 610 comprise that the query properties of each of the query candidates are used to determine a query plan. The query plan includes a set of query steps to be performed in order to query each of the query candidates.

Embodiments of block 610 may be carried out using query accessing component 230 (FIG. 2), graph configuration component 240 (FIG. 2), query planner component 250 (FIG. 2), data source accessing components 260 (FIG. 2), and/or query results component 270 (FIG. 2), in some implementations. Additional details of embodiments of block 610, or for carrying out operations of block 610, are described in connection to FIG. 2. Moreover, examples of knowledge graphs that are utilized to programmatically parallelize distributed graph queries of a graph metaphor of distributed data sources according to some embodiments of block 610 are illustratively depicted in FIGS. 3 and 4A-4D and described further in connection with the drawings. At block 620, method 600 includes determining, based on corresponding properties of the plurality of query candidates from the graph metaphor, a set of query steps representing a set of distributed queries of the plurality of query candidates. Some embodiments of block 620 comprise that at least one of the corresponding properties of the plurality of query candidates corresponds to an access control requirement, and wherein at least one of the set of query steps corresponds to the access control requirement.

Some embodiments of block 620 comprise that the query properties of each of the query candidates are used to determine a query plan. The query plan includes a set of query steps to be performed in order to query each of the query candidates.

Some embodiments of block 620 comprise that a parallelized query plan is determined based on the set of query steps in order to speed up execution of the query. The parallelized query plan is executed by executing parallelized distributed queries of the query candidates through plug-ins for each of the data sources, such as rest APIs, SQL database plug-ins, graph database plug-ins, search engine plug-ins, and/or any other plug-in for any type of data source.

Some embodiments of block 620 comprise that the parallelized query plan is determined based on latency, cost, reliability, and/or other similar factors, such as through statistics, rules, and/or heuristics. Some embodiments of block 620 comprise that a machine learning model is used to determine the parallelized query plan based on available metrics, such as expected performance gain due to parallelization, the cost in terms of CPU utilization, memory consumption, or computational cost, statistics on how frequently the result of executing the access control logic is positive, and/or any other factors.

Embodiments of block 620 may be carried out using query accessing component 230 (FIG. 2), graph configuration component 240 (FIG. 2), query planner component 250 (FIG. 2), data source accessing components 260 (FIG. 2), and/or query results component 270 (FIG. 2), in some implementations. Additional details of embodiments of block 620, or for carrying out operations of block 620, are described in connection to FIG. 2. Moreover, examples of knowledge graphs that are utilized to programmatically parallelize distributed graph queries of a graph metaphor of distributed data sources according to some embodiments of block 620 are illustratively depicted in FIGS. 3 and 4A-4D and described further in connection with the drawings.

At block 630, method 600 includes determining, based on evaluating corresponding latency of the set of query steps (for example, latency of each step of the step of query steps), a set of parallelized query steps where at least a portion of the query steps are executed in parallel. Some embodiments of block 630 comprise that executing at least the portion of the set of query steps in parallel further comprises fetching two or more portions of data corresponding to two or more nodes of the graph metaphor from two or more of the plurality of data sources in parallel. Some embodiments of block 630 comprise that executing at least the portion of the set of query steps in parallel further comprises fetching two or more portions of data corresponding to two or more edges of the graph metaphor from two or more of the plurality of data sources in parallel. Some embodiments of block 630 comprise that executing at least the portion of the set of query steps in parallel further comprises determining an access control requirement to two or more of the plurality of data sources in parallel. Some embodiments of block 630 comprise that executing at least the portion of the set of query steps in parallel further comprises determining an access control requirement to one of the plurality of data sources in parallel with fetching a portion of the data from a different one of the plurality of data sources. Some embodiments of block 630 comprise that executing at least the portion of the set of query steps in parallel further comprises determining an access control requirement to one of the plurality of data sources in parallel with fetching a portion of the data from the one of the plurality of data sources, wherein the portion of the database is maintained in a sandbox environment until the access control requirement is met.

Some embodiments of block 630 comprise that a parallelized query plan is determined based on the set of query steps in order to speed up execution of the query. The parallelized query plan is executed by executing parallelized distributed queries of the query candidates through plug-ins for each of the data sources, such as rest APIs, SQL database plug-ins, graph database plug-ins, search engine plug-ins, and/or any other plug-in for any type of data source.

Some embodiments of block 630 comprise that the parallelized query plan is determined based on latency, cost, reliability, and/or other similar factors, such as through statistics, rules, and/or heuristics. Some embodiments of block 630 comprise that a machine learning model is used to determine the parallelized query plan based on available metrics, such as expected performance gain due to parallelization, the cost in terms of CPU utilization, memory consumption, or computational cost, statistics on how frequently the result of executing the access control logic is positive, and/or any other factors.

Some embodiments of block 630 comprise that a query result is determined from the parallelized distributed queries of each of the data sources. For example, the results from execution of each of the parallelized distributed queries are combined, such as through a conflate operation and/or de-duplicating redundant data.

Embodiments of block 630 may be carried out using query accessing component 230 (FIG. 2), graph configuration component 240 (FIG. 2), query planner component 250 (FIG. 2), data source accessing components 260 (FIG. 2), and/or query results component 270 (FIG. 2), in some implementations. Additional details of embodiments of block 630, or for carrying out operations of block 630, are described in connection to FIG. 2. Moreover, examples of knowledge graphs that are utilized to programmatically parallelize distributed graph queries of a graph metaphor of distributed data sources according to some embodiments of block 630 are illustratively depicted in FIGS. 3 and 4A-4D and described further in connection with the drawings.

At block 640, method 600 includes determining, based on executing the set of parallelized query steps, data in response to the graph query. Some embodiments of block 640 comprise that executing at least the portion of the set of query steps in parallel further comprises fetching two or more portions of data corresponding to two or more nodes of the graph metaphor from two or more of the plurality of data sources in parallel. Some embodiments of block 640 comprise that executing at least the portion of the set of query steps in parallel further comprises fetching two or more portions of data corresponding to two or more edges of the graph metaphor from two or more of the plurality of data sources in parallel. Some embodiments of block 640 comprise that executing at least the portion of the set of query steps in parallel further comprises determining an access control requirement to two or more of the plurality of data sources in parallel. Some embodiments of block 640 comprise that executing at least the portion of the set of query steps in parallel further comprises determining an access control requirement to one of the plurality of data sources in parallel with fetching a portion of the data from a different one of the plurality of data sources. Some embodiments of block 640 comprise that executing at least the portion of the set of query steps in parallel further comprises determining an access control requirement to one of the plurality of data sources in parallel with fetching a portion of the data from the one of the plurality of data sources, wherein the portion of the database is maintained in a sandbox environment until the access control requirement is met.

Some embodiments of block 640 comprise that a parallelized query plan is determined based on the set of query steps in order to speed up execution of the query. The parallelized query plan is executed by executing parallelized distributed queries of the query candidates through plug-ins for each of the data sources, such as rest APIs, SQL database plug-ins, graph database plug-ins, search engine plug-ins, and/or any other plug-in for any type of data source.

Some embodiments of block 640 comprise that the parallelized query plan is determined based on latency, cost, reliability, and/or other similar factors, such as through statistics, rules, and/or heuristics. Some embodiments of block 640 comprise that a machine learning model is used to determine the parallelized query plan based on available metrics, such as expected performance gain due to parallelization, the cost in terms of CPU utilization, memory consumption, or computational cost, statistics on how frequently the result of executing the access control logic is positive, and/or any other factors.

Some embodiments of block 640 comprise that a query result is determined from the parallelized distributed queries of each of the data sources. For example, the results from execution of each of the parallelized distributed queries are combined, such as through a conflate operation and/or de-duplicating redundant data.

Embodiments of block 640 may be carried out using query accessing component 230 (FIG. 2), graph configuration component 240 (FIG. 2), query planner component 250 (FIG. 2), data source accessing components 260 (FIG. 2), and/or query results component 270 (FIG. 2), in some implementations. Additional details of embodiments of block 640, or for carrying out operations of block 640, are described in connection to FIG. 2. Moreover, examples of knowledge graphs that are utilized to programmatically parallelize distributed graph queries of a graph metaphor of distributed data sources according to some embodiments of block 640 are illustratively depicted in FIGS. 3 and 4A-4D and described further in connection with the drawings.

At block 650, method 600 includes causing a response to the graph query comprising the data. Some embodiments of block 650 comprise that a query result is determined from the parallelized distributed queries of each of the data sources. For example, the results from execution of each of the parallelized distributed queries are combined, such as through a conflate operation and/or de-duplicating redundant data. Some embodiments of block 650 comprise that the query result is then presented to the user in response to the query.

Embodiments of block 650 may be carried out using query accessing component 230 (FIG. 2), graph configuration component 240 (FIG. 2), query planner component 250 (FIG. 2), data source accessing components 260 (FIG. 2), and/or query results component 270 (FIG. 2), in some implementations. Additional details of embodiments of block 650, or for carrying out operations of block 650, are described in connection to FIG. 2. Moreover, examples of knowledge graphs that are utilized to programmatically parallelize distributed graph queries of a graph metaphor of distributed data sources according to some embodiments of block 650 are illustratively depicted in FIGS. 3 and 4A-4D and described further in connection with the drawings.

Accordingly, we have described various aspects of technology directed to systems and methods for intelligently processing and presenting, on a computing device, group data that is contextualized for a user. It is understood that various features, sub-combinations, and modifications of the embodiments described herein are of utility and may be employed in other embodiments without reference to other features or sub-combinations. Moreover, the order and sequences of steps shown in the example methods 500 and 600 are not meant to limit the scope of the present disclosure in any way, and in fact, the steps may occur in a variety of different sequences within embodiments hereof. Such variations and combinations thereof are also contemplated to be within the scope of embodiments of this disclosure.

OTHER EMBODIMENTS

In some embodiments, a computerized system to programmatically parallelize distributed graph queries of a graph metaphor using a knowledge graph of distributed data sources is provided, such as the computerized system described in any of the embodiments above. The computerized system comprises at least one processor, and computer memory storing computer-readable instructions, that, when executed by the at least one processor, cause the at least one processor to perform operations. The operations comprise determining, based on applying a graph query to a graph metaphor, a plurality of query candidates corresponding to a plurality of data sources. The operation may further comprise determining, based on corresponding properties of the plurality of query candidates from the graph metaphor, a set of query steps representing a set of distributed queries of the plurality of query candidates. The operations may further comprise determining, based on executing at least a portion of the set of query steps in parallel, data in response to the graph query. The operations may further comprise causing a response to the graph query comprising the data. Advantageously, these and other embodiments, as described herein, improve existing computing technologies by providing new or improved functionality in computing applications including automated computing technology for programmatically parallelizing distributed graph queries of a graph metaphor of distributed data sources by determining a parallelized query plan from properties stored with respect to a graph metaphor, as provided herein, can be beneficial for enabling improved computing applications and an improved user computing experience. For example, automated computing technology for programmatically parallelizing distributed graph queries of a graph metaphor of distributed data sources speeds up the query execution and reduces the latency and/or computing and networking resources utilized during search query operations of a graph metaphor of distributed data sources by facilitating parallelization of the queries of the distributed data sources. The parallelization of the queries of the distributed data sources speeds up the query execution and reduces the latency and/or computing and networking resources utilized as the parallelized queries are simultaneously executed across the distributed data sources (e.g., and the corresponding database management system of each of the distributed data sources) allowing for simultaneous data retrieval operations and/or access control operations, thereby reducing the total response time to the query. In this regard, the speed of the query execution is increased, latency is decreased, and/or the computing and network resources are conserved. Further, embodiments of this disclosure address a need that arises from a very large scale of operations created by software-based services that cannot be managed by humans. The actions/operations described herein are not a mere use of a computer, but address results of a system that is a direct consequence of software used as a service offered in conjunction with user communication through services hosted across a variety of platforms and devices. Further still, embodiments of this disclosure enable an improved user experience across a number of computer devices, applications, and platforms. Further still, embodiments described herein enable the programmatic parallelizing of distributed graph queries of a graph metaphor of distributed data sources without requiring computer tools and resources for a user to manually perform operations to produce this outcome. In this way, some embodiments, as described herein, reduce or eliminate a need for certain data sources, data storage, and computer controls for enabling manually performed steps by an administrator, or the user themselves, to search, identify, assess, and configure (e.g., by hard-coding) specific, static data, thereby reducing the consumption of computing resources.

In any combination of the above embodiments of the system, each node of the graph metaphor comprises a corresponding node descriptive attribute and a corresponding node query property, and each edge of the graph metaphor comprises a corresponding edge descriptive attribute and a corresponding edge query property.

In any combination of the above embodiments of the system, at least one of the corresponding properties of the plurality of query candidates corresponds to an access control requirement, and wherein at least one of the set of query steps corresponds to the access control requirement.

In any combination of the above embodiments of the system, executing at least the portion of the set of query steps in parallel further comprises: fetching two or more portions of data corresponding to two or more nodes of the graph metaphor from two or more of the plurality of data sources in parallel.

In any combination of the above embodiments of the system, executing at least the portion of the set of query steps in parallel further comprises: fetching two or more portions of data corresponding to two or more edges of the graph metaphor from two or more of the plurality of data sources in parallel.

In any combination of the above embodiments of the system, executing at least the portion of the set of query steps in parallel further comprises: determining an access control requirement to two or more of the plurality of data sources in parallel.

In any combination of the above embodiments of the system, executing at least the portion of the set of query steps in parallel further comprises: determining an access control requirement to one of the plurality of data sources in parallel with fetching a portion of the data from a different one of the plurality of data sources.

In any combination of the above embodiments of the system, executing at least the portion of the set of query steps in parallel further comprises: determining an access control requirement to one of the plurality of data sources in parallel with fetching a portion of the data from the one of the plurality of data sources, wherein the portion of the database is maintained in a sandbox environment until the access control requirement is met.

In some embodiments, a computer-implemented method is provided. The method comprises determining, based on applying a graph query to a graph metaphor, a plurality of query candidates corresponding to a plurality of data sources. The method further comprises determining, based on corresponding properties of the plurality of query candidates from the graph metaphor, a set of query steps representing a set of distributed queries of the plurality of query candidates. The method further comprises determining, based on evaluating corresponding latency of the set of query steps, a set of parallelized query steps where at least a portion of the query steps are executed in parallel. The method further comprises determining, based on executing the set of parallelized query steps, data in response to the graph query. The method further comprises causing a response to the graph query comprising the data. Advantageously, these and other embodiments, as described herein, improve existing computing technologies by providing new or improved functionality in computing applications including automated computing technology for programmatically parallelizing distributed graph queries of a graph metaphor of distributed data sources by determining a parallelized query plan from properties stored with respect to a graph metaphor, as provided herein, can be beneficial for enabling improved computing applications and an improved user computing experience. For example, automated computing technology for programmatically parallelizing distributed graph queries of a graph metaphor of distributed data sources speeds up the query execution and reduces the latency and/or computing and networking resources utilized during search query operations of a graph metaphor of distributed data sources by facilitating parallelization of the queries of the distributed data sources. The parallelization of the queries of the distributed data sources speeds up the query execution and reduces the latency and/or computing and networking resources utilized as the parallelized queries are simultaneously executed across the distributed data sources (e.g., and the corresponding database management system of each of the distributed data sources) allowing for simultaneous data retrieval operations and/or access control operations, thereby reducing the total response time to the query. In this regard, the speed of the query execution is increased, latency is decreased, and/or the computing and network resources are conserved. Further, embodiments of this disclosure address a need that arises from a very large scale of operations created by software-based services that cannot be managed by humans. The actions/operations described herein are not a mere use of a computer, but address results of a system that is a direct consequence of software used as a service offered in conjunction with user communication through services hosted across a variety of platforms and devices. Further still, embodiments of this disclosure enable an improved user experience across a number of computer devices, applications, and platforms. Further still, embodiments described herein enable the programmatic parallelizing of distributed graph queries of a graph metaphor of distributed data sources without requiring computer tools and resources for a user to manually perform operations to produce this outcome. In this way, some embodiments, as described herein, reduce or eliminate a need for certain data sources, data storage, and computer controls for enabling manually performed steps by an administrator, or the user themselves, to search, identify, assess, and configure (e.g., by hard-coding) specific, static data, thereby reducing the consumption of computing resources.

In any combination of the above embodiments of the method, each node of the graph metaphor comprises a corresponding node descriptive attribute and a corresponding node query property, and each edge of the graph metaphor comprises a corresponding edge descriptive attribute and a corresponding edge query property.

In any combination of the above embodiments of the method, at least one of the corresponding properties of the plurality of query candidates corresponds to an access control requirement, and wherein at least one of the set of query steps corresponds to the access control requirement.

In any combination of the above embodiments of the method, executing the set of parallelized query steps further comprises: fetching two or more portions of data corresponding to two or more nodes of the graph metaphor from two or more of the plurality of data sources in parallel.

In any combination of the above embodiments of the method, executing the set of parallelized query steps further comprises: fetching two or more portions of data corresponding to two or more edges of the graph metaphor from two or more of the plurality of data sources in parallel.

In any combination of the above embodiments of the method, executing the set of parallelized query steps further comprises: determining an access control requirement to two or more of the plurality of data sources in parallel.

In any combination of the above embodiments of the method, executing the set of parallelized query steps further comprises: determining an access control requirement to one of the plurality of data sources in parallel with fetching a portion of the data from a different one of the plurality of data sources.

In any combination of the above embodiments of the method, executing the set of parallelized query steps further comprises: determining an access control requirement to one of the plurality of data sources in parallel with fetching a portion of the data from the one of the plurality of data sources, wherein the portion of the database is maintained in a sandbox environment until the access control requirement is met.

In some embodiments, one or more computer storage media having computer-executable instructions embodied thereon that, when executed by a computing system having at least one processor and at least one memory, cause the at least one processor to perform operations. The operations comprise determining, based on applying a graph query to a graph metaphor, a plurality of query candidates corresponding to a plurality of data sources. The operations may further comprise determining, based on corresponding properties of the plurality of query candidates from the graph metaphor, a set of query steps representing a set of distributed queries of the plurality of query candidates. The operations may further comprise determining, based on executing at least a portion of the set of query steps in parallel, data in response to the graph query. The operations may further comprise causing presentation of the data in response to the graph query. Advantageously, these and other embodiments, as described herein, improve existing computing technologies by providing new or improved functionality in computing applications including automated computing technology for programmatically parallelizing distributed graph queries of a graph metaphor of distributed data sources by determining a parallelized query plan from properties stored with respect to a graph metaphor, as provided herein, can be beneficial for enabling improved computing applications and an improved user computing experience. For example, automated computing technology for programmatically parallelizing distributed graph queries of a graph metaphor of distributed data sources speeds up the query execution and reduces the latency and/or computing and networking resources utilized during search query operations of a graph metaphor of distributed data sources by facilitating parallelization of the queries of the distributed data sources. The parallelization of the queries of the distributed data sources speeds up the query execution and reduces the latency and/or computing and networking resources utilized as the parallelized queries are simultaneously executed across the distributed data sources (e.g., and the corresponding database management system of each of the distributed data sources) allowing for simultaneous data retrieval operations and/or access control operations, thereby reducing the total response time to the query. In this regard, the speed of the query execution is increased, latency is decreased, and/or the computing and network resources are conserved. Further, embodiments of this disclosure address a need that arises from a very large scale of operations created by software-based services that cannot be managed by humans. The actions/operations described herein are not a mere use of a computer, but address results of a system that is a direct consequence of software used as a service offered in conjunction with user communication through services hosted across a variety of platforms and devices. Further still, embodiments of this disclosure enable an improved user experience across a number of computer devices, applications, and platforms. Further still, embodiments described herein enable the programmatic parallelizing of distributed graph queries of a graph metaphor of distributed data sources without requiring computer tools and resources for a user to manually perform operations to produce this outcome. In this way, some embodiments, as described herein, reduce or eliminate a need for certain data sources, data storage, and computer controls for enabling manually performed steps by an administrator, or the user themselves, to search, identify, assess, and configure (e.g., by hard-coding) specific, static data, thereby reducing the consumption of computing resources.

In any combination of the above embodiments, each node of the graph metaphor comprises a corresponding node descriptive attribute and a corresponding node query property, and each edge of the graph metaphor comprises a corresponding edge descriptive attribute and a corresponding edge query property.

In any combination of the above embodiments, at least one of the corresponding properties of the plurality of query candidates corresponds to an access control requirement, and wherein at least one of the set of query steps corresponds to the access control requirement.

In any combination of the above embodiments, executing at least the portion of the set of query steps in parallel further comprises: fetching two or more portions of data corresponding to two or more nodes of the graph metaphor from two or more of the plurality of data sources in parallel.

Example Computing Environments

Figure 7:
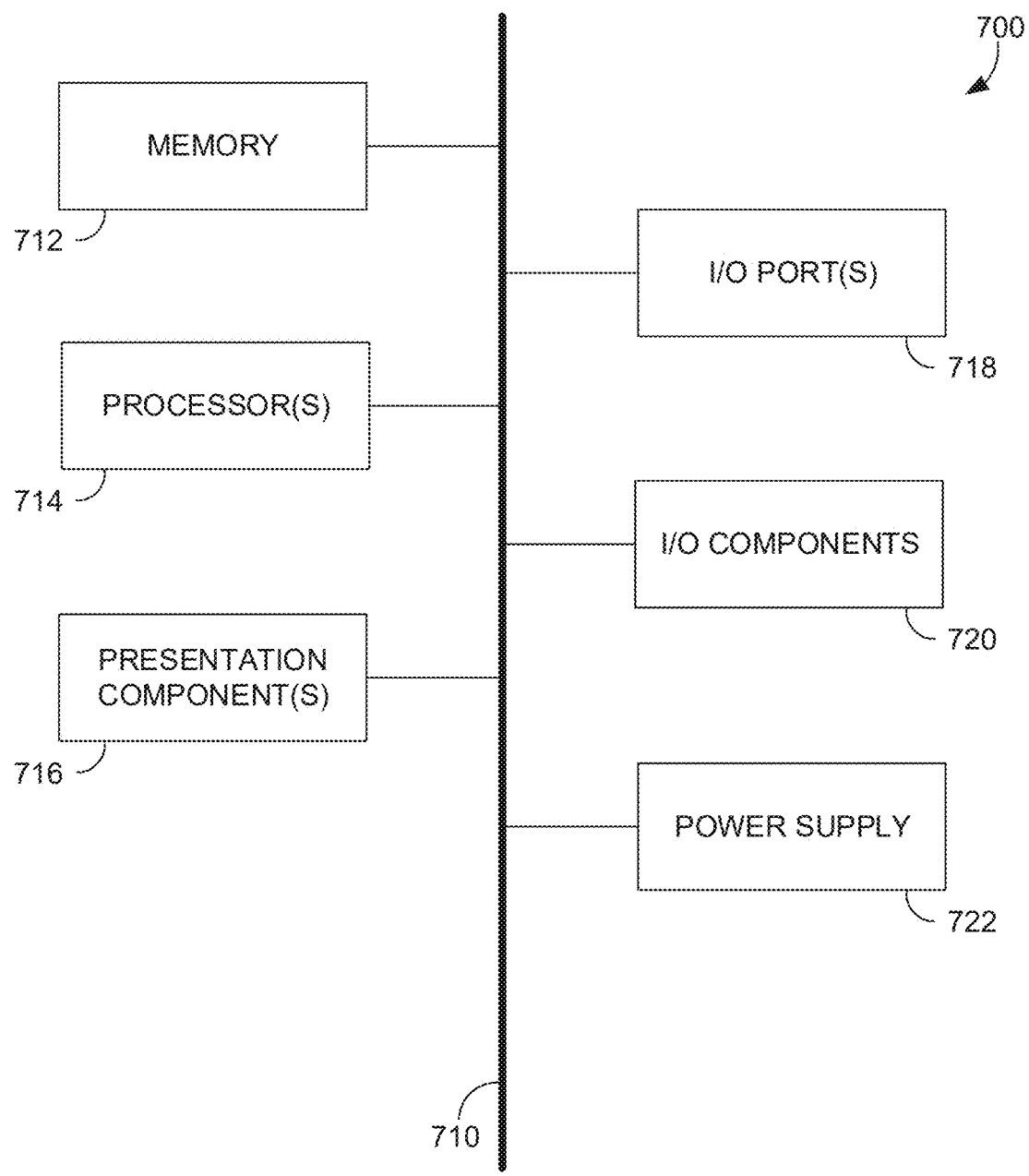
FIG. 7 is a block diagram of an example computing environment suitable for use in implementing an embodiment of the present disclosure.
Figure 8:
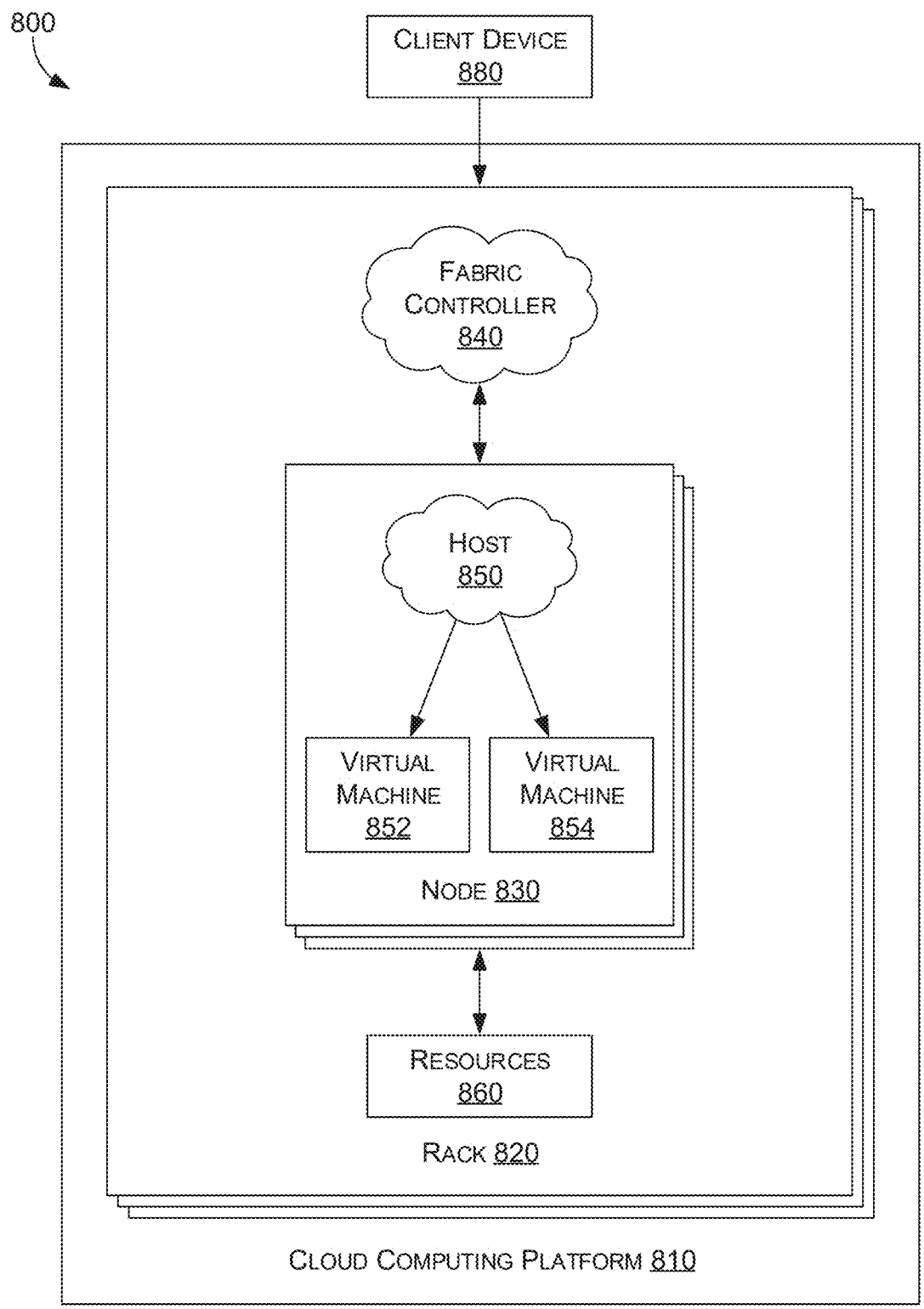
FIG. 8 is a block diagram of an example computing environment suitable for use in implementing an embodiment of the present disclosure.

Having described various implementations, several example computing environments suitable for implementing embodiments of the disclosure are now described, including an example computing device and an example distributed computing environment in FIGS. 8 and 9, respectively. With reference to FIG. 7, an exemplary computing device is provided and referred to generally as computing device 700. The computing device 700 is but one example of a suitable computing environment and is not intended to suggest any limitation as to the scope of use or functionality of embodiments of the disclosure. Neither should the computing device 700 be interpreted as having any dependency or requirement relating to any one or combination of components illustrated.

Embodiments of the disclosure may be described in the general context of computer code or machine-useable instructions, including computer-useable or computer-executable instructions, such as program modules, being executed by a computer or other machine such as a smartphone, a tablet PC, or other mobile device, server, or client device. Generally, program modules, including routines, programs, objects, components, data structures, and the like, refer to code that performs particular tasks or implements particular abstract data types. Embodiments of the disclosure may be practiced in a variety of system configurations, including mobile devices, consumer electronics, general-purpose computers, more specialty computing devices, or the like. Embodiments of the disclosure may also be practiced in distributed computing environments where tasks are performed by remote-processing devices that are linked through a communications network. In a distributed computing environment, program modules may be located in both local and remote computer storage media including memory storage devices.

Some embodiments may comprise an end-to-end software-based system that can operate within system components described herein to operate computer hardware to provide system functionality. At a low level, hardware processors may execute instructions selected from a machine language (also referred to as machine code or native) instruction set for a given processor. The processor recognizes the native instructions and performs corresponding low level functions relating to, for example, logic, control, and memory operations. Low level software written in machine code can provide more complex functionality to higher levels of software. Accordingly, in some embodiments, computer-executable instructions may include any software, including low level software written in machine code, higher level software such as application software, and any combination thereof. In this regard, the system components can manage resources and provide services for system functionality. Any other variations and combinations thereof are contemplated with the embodiments of the present disclosure.

With reference to FIG. 7, computing device 700 includes a bus 710 that directly or indirectly couples the following devices: memory 712, one or more processors 714, one or more presentation components 716, one or more input/output (I/O) ports 718, one or more I/O components 720, and an illustrative power supply 722. Bus 710 represents what may be one or more buses (such as an address bus, data bus, or combination thereof). Although the various blocks of FIG. 7 are shown with lines for the sake of clarity, in reality, these blocks represent logical, not necessarily actual, components. For example, one may consider a presentation component such as a display device to be an I/O component. Also, processors have memory. The inventors hereof recognize that such is the nature of the art and reiterate that the diagram of FIG. 7 is merely illustrative of an exemplary computing device that can be used in connection with one or more embodiments of the present disclosure. Distinction is not made between such categories as "workstation," "server," "laptop," or "handheld device," as all are contemplated within the scope of FIG. 7 and with reference to "computing device."

Computing device 700 typically includes a variety of computer-readable media. Computer-readable media can be any available media that can be accessed by computing device 700 and includes both volatile and nonvolatile, removable and non-removable media. By way of example, and not limitation, computer-readable media may comprise computer storage media and communication media. Computer storage media includes both volatile and nonvolatile, removable and non-removable media implemented in any method or technology for storage of information such as computer-readable instructions, data structures, program modules, or other data. Computer storage media includes, but is not limited to, RAM, ROM, EEPROM, flash memory or other memory technology, CD-ROM, digital versatile disks (DVDs) or other optical disk storage, magnetic cassettes, magnetic tape, magnetic disk storage or other magnetic storage devices, or any other medium which can be used to store the desired information and which can be accessed by computing device 700. Computer storage media does not comprise signals per se. Communication media typically embodies computer-readable instructions, data structures, program modules, or other data in a modulated data signal such as a carrier wave or other transport mechanism and includes any information delivery media. The term "modulated data signal" means a signal that has one or more of its characteristics set or changed in such a manner so as to encode information in the signal. By way of example, and not limitation, communication media includes wired media, such as a wired network or direct-wired connection, and wireless media, such as acoustic, RF, infrared, and other wireless media. Combinations of any of the above should also be included within the scope of computer-readable media.

Memory 712 includes computer storage media in the form of volatile and/or nonvolatile memory. The memory may be removable, non-removable, or a combination thereof. Exemplary hardware devices include, for example, solid-state memory, hard drives, and optical-disc drives. Computing device 700 includes one or more processors 714 that read data from various entities such as memory 712 or I/O components 720. Presentation component(s) 716 presents data indications to a user or other device. Exemplary presentation components include a display device, speaker, printing component, vibrating component, and the like.

The I/O ports 718 allow computing device 700 to be logically coupled to other devices, including I/O components 720, some of which may be built in. Illustrative components include a microphone, joystick, game pad, satellite dish, scanner, printer, or a wireless device. The I/O components 720 may provide a natural user interface (NUI) that processes air gestures, voice, or other physiological inputs generated by a user. In some instances, inputs may be transmitted to an appropriate network element for further processing. An NUI may implement any combination of speech recognition, touch and stylus recognition, facial recognition, biometric recognition, gesture recognition both on screen and adjacent to the screen, air gestures, head and eye tracking, and touch recognition associated with displays on the computing device 700. The computing device 700 may be equipped with depth cameras, such as stereoscopic camera systems, infrared camera systems, RGB camera systems, and combinations of these, for gesture detection and recognition. Additionally, the computing device 700 may be equipped with accelerometers or gyroscopes that enable detection of motion. The output of the accelerometers or gyroscopes may be provided to the display of the computing device 700 to render immersive augmented reality or virtual reality.

Some embodiments of computing device 700 may include one or more radio(s) (or similar wireless communication components). The radio transmits and receives radio or wireless communications. The computing device 700 may be a wireless terminal adapted to receive communications and media over various wireless networks. Computing device 700 may communicate via wireless protocols, such as code division multiple access ("CDMA"), global system for mobiles ("GSM"), or time division multiple access ("TDMA"), as well as others, to communicate with other devices. The radio communications may be a short-range connection, a long-range connection, or a combination of both a short-range and a long-range wireless telecommunications connection. When we refer to "short" and "long" types of connections, we do not mean to refer to the spatial relation between two devices. Instead, we are generally referring to short range and long range as different categories, or types, of connections (for example, a primary connection and a secondary connection). A short-range connection may include, by way of example and not limitation, a Wi-Fi® connection to a device (e.g., mobile hotspot) that provides access to a wireless communications network, such as a WLAN connection using the 802.11 protocol; a Bluetooth connection to another computing device is a second example of a short-range connection, or a near-field communication connection. A long-range connection may include a connection using, by way of example and not limitation, one or more of CDMA, GPRS, GSM, TDMA, and 802.16 protocols.

Referring now to FIG. 8, an example distributed computing environment 800 is illustratively provided, in which implementations of the present disclosure may be employed. In particular, FIG. 8 shows a high level architecture of an example cloud computing platform 810 that can host a technical solution environment, or a portion thereof (e.g., a data trustee environment). It should be understood that this and other arrangements described herein are set forth only as examples. For example, as described above, many of the elements described herein may be implemented as discrete or distributed components or in conjunction with other components, and in any suitable combination and location. Other arrangements and elements (e.g., machines, interfaces, functions, orders, and groupings of functions) can be used in addition to or instead of those shown.

Data centers can support distributed computing environment 800 that includes cloud computing platform 810, rack 820, and node 830 (e.g., computing devices, processing units, or blades) in rack 820. The technical solution environment can be implemented with cloud computing platform 810, which runs cloud services across different data centers and geographic regions. Cloud computing platform 810 can implement fabric controller 840 component for provisioning and managing resource allocation, deployment, upgrade, and management of cloud services. Typically, cloud computing platform 810 acts to store data or run service applications in a distributed manner. Cloud computing infrastructure 810 in a data center can be configured to host and support operation of endpoints of a particular service application. Cloud computing infrastructure 810 may be a public cloud, a private cloud, or a dedicated cloud.

Node 830 can be provisioned with host 850 (e.g., operating system or runtime environment) running a defined software stack on node 830. Node 830 can also be configured to perform specialized functionality (e.g., compute nodes or storage nodes) within cloud computing platform 810. Node 830 is allocated to run one or more portions of a service application of a tenant. A tenant can refer to a customer utilizing resources of cloud computing platform 810. Service application components of cloud computing platform 810 that support a particular tenant can be referred to as a multi-tenant infrastructure or tenancy. The terms "service application," "application," or "service" are used interchangeably with regards to FIG. 8, and broadly refer to any software, or portions of software, that run on top of, or access storage and computing device locations within, a datacenter.

When more than one separate service application is being supported by nodes 830, nodes 830 may be partitioned into virtual machines (e.g., virtual machine 852 and virtual machine 854). Physical machines can also concurrently run separate service applications. The virtual machines or physical machines can be configured as individualized computing environments that are supported by resources 860 (e.g., hardware resources and software resources) in cloud computing platform 810. It is contemplated that resources can be configured for specific service applications. Further, each service application may be divided into functional portions such that each functional portion is able to run on a separate virtual machine. In cloud computing platform 810, multiple servers may be used to run service applications and perform data storage operations in a cluster. In particular, the servers may perform data operations independently but exposed as a single device, referred to as a cluster. Each server in the cluster can be implemented as a node.

Client device 880 may be linked to a service application in cloud computing platform 810. Client device 880 may be any type of computing device, such as user device 102*n* described with reference to FIG. 1, and the client device 880 can be configured to issue commands to cloud computing platform 810. In embodiments, client device 880 may communicate with service applications through a virtual Internet Protocol (IP) and load balancer or other means that direct communication requests to designated endpoints in cloud computing platform 810. The components of cloud computing platform 810 may communicate with each other over a network (not shown), which may include, without limitation, one or more local area networks (LANs) and/or wide area networks (WANs).

Additional Structural and Functional Features of Embodiments of the Technical Solution Having identified various components utilized herein, it should be understood that any number of components and arrangements may be employed to achieve the desired functionality within the scope of the present disclosure. For example, the components in the embodiments depicted in the figures are shown with lines for the sake of conceptual clarity. Other arrangements of these and other components may also be implemented. For example, although some components are depicted as single components, many of the elements described herein may be implemented as discrete or distributed components or in conjunction with other components, and in any suitable combination and location. Some elements may be omitted altogether. Moreover, various functions described herein as being performed by one or more entities may be carried out by hardware, firmware, and/or software, as described below. For instance, various functions may be carried out by a processor executing instructions stored in memory. As such, other arrangements and elements (e.g., machines, interfaces, functions, orders, and groupings of functions) can be used in addition to or instead of those shown.

Embodiments described in the paragraphs below may be combined with one or more of the specifically described alternatives. In particular, an embodiment that is claimed may contain a reference, in the alternative, to more than one other embodiment. The embodiment that is claimed may specify a further limitation of the subject matter claimed.

For purposes of this disclosure, the word "including" has the same broad meaning as the word "comprising," and the word "accessing" comprises "receiving," "referencing," or "retrieving." Furthermore, the word "communicating" has the same broad meaning as the word "receiving," or "transmitting" facilitated by software or hardware-based buses, receivers, or transmitters using communication media described herein. In addition, words such as "a" and "an," unless otherwise indicated to the contrary, include the plural as well as the singular. Thus, for example, the constraint of "a feature" is satisfied where one or more features are present. Also, the term "or" includes the conjunctive, the disjunctive, and both (a or b thus includes either a or b, as well as a and b).

For purposes of a detailed discussion above, embodiments of the present invention are described with reference to a computing device or a distributed computing environment; however the computing device and distributed computing environment depicted herein is merely exemplary. Components can be configured for performing novel aspects of embodiments, where the term "configured for" can refer to "programmed to" perform particular tasks or implement particular abstract data types using code. Further, while embodiments of the present invention may generally refer to the technical solution environment and the schematics described herein, it is understood that the techniques described may be extended to other implementation contexts.

Many different arrangements of the various components depicted, as well as components not shown, are possible without departing from the scope of the claims below. Embodiments of the present disclosure have been described with the intent to be illustrative rather than restrictive. Alternative embodiments will become apparent to readers of this disclosure after and because of reading it. Alternative means of implementing the aforementioned can be completed without departing from the scope of the claims below. Certain features and sub-combinations are of utility and may be employed without reference to other features and sub-combinations and are contemplated within the scope of the claims.

The invention claimed is:

1. A computerized system comprising:
at least one processor; and
computer memory storing computer-useable instructions that, when executed by the at least one processor, cause the at least one processor to perform operations comprising:
determining, based on applying a graph query to a graph metaphor, a plurality of query candidates corresponding to a plurality of data sources, each of the data sources corresponding to a different region of a federated database system;
determining, based on corresponding properties of the plurality of query candidates from the graph metaphor, a set of query steps representing a set of distributed queries of the plurality of query candidates;
determining data in response to the graph query from the plurality of data sources based on executing at least a portion of the set of query steps in parallel comprising determining an access control requirement to one of the plurality of data sources in parallel with fetching a portion of the data from a different one of the plurality of data sources; and
causing a response to the graph query comprising the data.

2. The computerized system of claim 1, wherein each node of the graph metaphor comprises a corresponding node descriptive attribute and a corresponding node query property, and each edge of the graph metaphor comprises a corresponding edge descriptive attribute and a corresponding edge query property.

3. The computerized system of claim 1, wherein at least one of the corresponding properties of the plurality of query candidates corresponds to the access control requirement, and wherein at least one of the set of query steps corresponds to the access control requirement.

4. The computerized system of claim 1, wherein executing at least the portion of the set of query steps in parallel further comprises: fetching two or more additional portions of data corresponding to two or more nodes of the graph metaphor from two or more other data sources of the plurality of data sources in parallel, wherein the two or more other data sources of the plurality of data sources correspond to different corresponding regions of the federated database system.

5. The computerized system of claim 1, wherein executing at least the portion of the set of query steps in parallel further comprises:
fetching two or more additional portions of data corresponding to two or more edges of the graph metaphor from two or more other data sources of the plurality of data sources in parallel.

6. The computerized system of claim 1, wherein executing at least the portion of the set of query steps in parallel further comprises:
determining additional access control requirements to two or more other data sources of the plurality of data sources in parallel.

7. The computerized system of claim 1, wherein the portion of a database is maintained in a sandbox environment until the access control requirement is met.

8. A computer-implemented method comprising:
determining, based on applying a graph query to a graph metaphor, a plurality of query candidates corresponding to a plurality of data sources, each of the data sources corresponding to a different region of a federated database system;
determining, based on corresponding properties of the plurality of query candidates from the graph metaphor, a set of query steps representing a set of distributed queries of the plurality of query candidates;
determining, based on evaluating corresponding latency of the set of query steps, a set of parallelized query steps where at least a portion of the query steps are executed in parallel;
determining data in response to the graph query from the plurality of data sources based on executing the set of parallelized query steps comprising determining an access control requirement to one of the plurality of data sources in parallel with fetching a portion of the data from the one of the plurality of data sources, wherein the portion of a database is maintained in a sandbox environment until the access control requirement is met; and causing a response to the graph query comprising the data.

9. The computer-implemented method of claim 8, wherein each node of the graph metaphor comprises a corresponding node descriptive attribute and a corresponding node query property, and each edge of the graph metaphor comprises a corresponding edge descriptive attribute and a corresponding edge query property.

10. The computer-implemented method of claim 8, wherein at least one of the corresponding properties of the plurality of query candidates corresponds to the access control requirement, and wherein at least one of the set of query steps corresponds to the access control requirement.

11. The computer-implemented method of The computer-implemented method of wherein executing the set of parallelized query steps further comprises:
fetching two or more additional portions of data corresponding to two or more nodes of the graph metaphor from two or more other data sources of the plurality of data sources in parallel, wherein the two or more other data sources of the plurality of data sources correspond to different corresponding regions of the federated database system.

12. The computer-implemented method of claim 8, wherein executing the set of parallelized query steps further comprises:
fetching two or more additional portions of data corresponding to two or more edges of the graph metaphor from two or more other data sources of the plurality of data sources in parallel.

13. The computer-implemented method of claim 8, wherein executing the set of parallelized query steps further comprises:
determining additional access control requirements to two or more other data sources of the plurality of data sources in parallel.

14. One or more computer storage media having computer-executable instructions embodied thereon that, when executed by a computing system having at least one processor and at least one memory, cause the at least one processor to perform operations comprising:
determining, based on applying a graph query to a graph metaphor, a plurality of query candidates corresponding to a plurality of data sources, each of the data sources corresponding to a different region of a federated database system;
determining, based on corresponding properties of the plurality of query candidates from the graph metaphor, a set of query steps representing a set of distributed queries of the plurality of query candidates;
determining data in response to the graph query from the plurality of data sources based on executing at least a portion of the set of query steps in parallel comprising determining an access control requirement to one of the plurality of data sources in parallel with fetching a portion of the data from a different one of the plurality of data sources;
and causing presentation of the data in response to the graph query.

15. The one or more computer storage media of claim 14, wherein each node of the graph metaphor comprises a corresponding node descriptive attribute and a corresponding node query property, and each edge of the graph metaphor comprises a corresponding edge descriptive attribute and a corresponding edge query property.

16. The one or more computer storage media of claim 14, wherein at least one of the corresponding properties of the plurality of query candidates corresponds to an access control requirement, and wherein at least one of the set of query steps corresponds to the access control requirement.

17. The one or more computer storage media of claim 14, wherein executing at least the portion of the set of query steps in parallel further comprises:
fetching two or more portions of data corresponding to two or more nodes of the graph metaphor from two or more of the plurality of data sources in parallel, wherein the two or more of the plurality of data sources correspond to different corresponding regions of the federated database system.

18. The one or more computer storage media of claim 14, wherein executing at least the portion of the set of query steps in parallel further comprises:
fetching two or more portions of data corresponding to two or more edges of the graph metaphor from two or more of the plurality of data sources in parallel.

19. The one or more computer storage media of claim 14, wherein executing at least the portion of the set of query steps in parallel further comprises:
determining an access control requirement to two or more of the plurality of data sources in parallel.

20. The one or more computer storage media of claim 14, wherein executing at least the portion of the set of query steps in parallel further comprises:

determining an access control requirement to one of the plurality of data sources in parallel with fetching a portion of the data from the one of the plurality of data sources.

\* \* \* \* \*